United States Patent
Vetro et al.

(10) Patent No.: US 6,519,288 B1
(45) Date of Patent: Feb. 11, 2003

(54) THREE-LAYER SCALEABLE DECODER AND METHOD OF DECODING

(75) Inventors: Anthony Vetro, Staten Island, NY (US); Huifang Sun, Cranbury, NJ (US); Tommy Poon, Murray Hill, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 09/035,969

(22) Filed: Mar. 6, 1998

(51) Int. Cl.[7] .............................................. H04N 07/18
(52) U.S. Cl. .............................. 375/240.21; 375/240.29
(58) Field of Search .................................. 348/394, 390, 348/397, 398, 404, 405, 407, 411, 412, 413, 415, 416, 426, 427, 443, 444; 375/240.01–240.29

(56) References Cited

U.S. PATENT DOCUMENTS

| | | | | |
|---|---|---|---|---|
| 5,485,215 A | * | 1/1996 | Meyer et al. | 348/423 |
| 5,485,279 A | * | 1/1996 | Yonemitsu et al. | 348/411 |
| 5,737,019 A | * | 4/1998 | Kim | 348/390 |
| 5,835,151 A | * | 11/1998 | Sun et al. | 348/441 |
| 5,973,739 A | * | 10/1999 | Nillsson | 348/397 |
| 5,978,081 A | * | 11/1999 | Michael et al. | 356/243.1 |
| 5,990,958 A | * | 11/1999 | Bheda et al. | 348/407 |
| 6,018,366 A | * | 1/2000 | Asai et al. | 348/394 |
| 6,025,878 A | * | 2/2000 | Boyce et al. | 348/402 |
| 6,184,935 B1 | * | 2/2001 | Iaquinto et al. | 348/441 |

* cited by examiner

*Primary Examiner*—Andy Rao
(74) *Attorney, Agent, or Firm*—Dirk Brinkman

(57) ABSTRACT

The apparatus for decoding a digital signal includes a composite picture forming unit for forming a composite picture from a first digital video signal and a second digital video signal. The first digital video signal includes inter-coded picture data. A down-converter receives a third digital video signal, and outputs the third digital video signal to the composite picture forming unit as the first digital signal in a first mode. However, the down-converter down-converts the third digital video signal into a fourth digital video signal in a second mode, and outputs the fourth digital video signal to the composite picture forming unit in the second mode. A memory stores the anchor pictures output from the composite picture forming unit, and a motion compensator generates the second digital signal based on the stored anchor pictures.

4 Claims, 15 Drawing Sheets

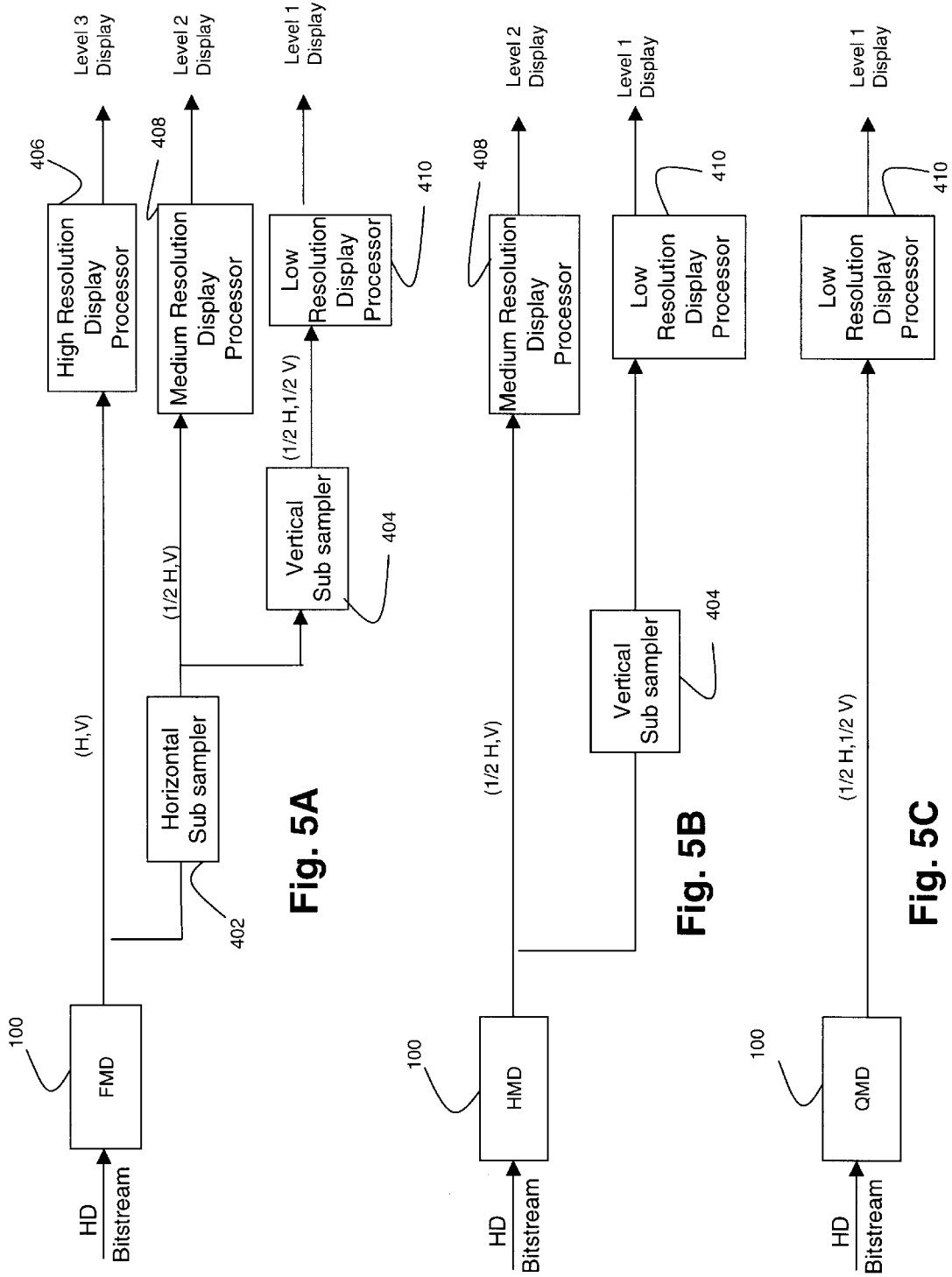

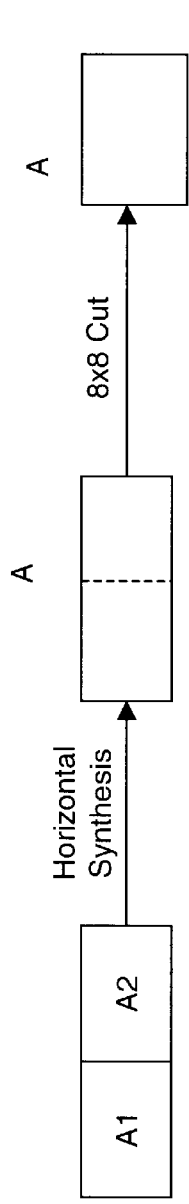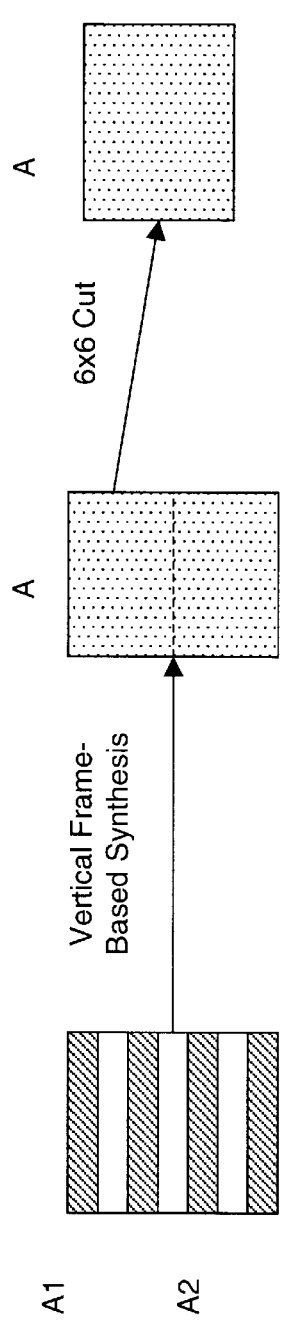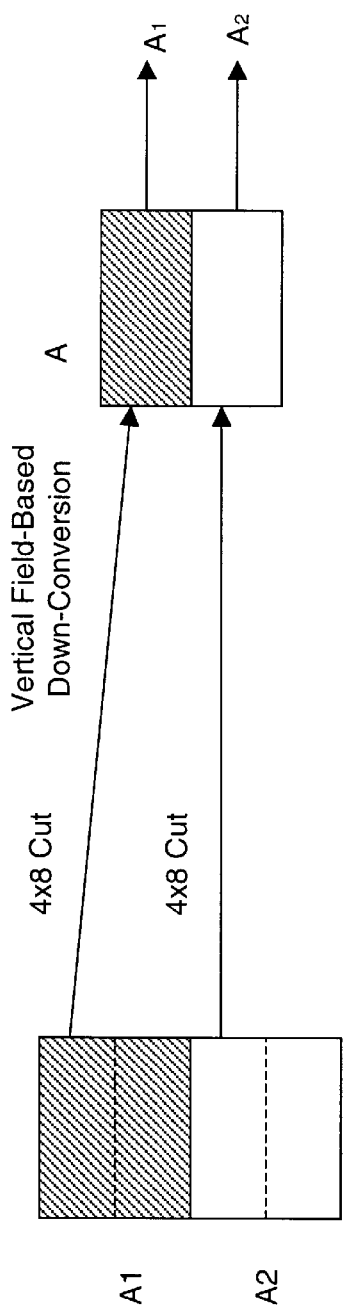
Fig. 6A   Fig. 6B   Fig. 6C

THREE-LAYER SCALEABLE DECODER AND METHOD OF DECODING

BACKGROUND OF THE INVENTION

1. Field of the Invention

The present invention relates to a method and apparatus for decoding High Definition (HD) television signals and generating low resolution versions of the HD signals; and more particularly to a three-layer scaleable decoder and method of decoding.

2. Description of the Related Art

Digital video signal processing is an area of science and engineering that has developed rapidly over the past decade. The maturity of the Moving Picture Expert Group (MPEG) video coding standard represents a very important achievement for the video industry and provides strong support for digital transmission of video signals. With advancements in digital compression and other techniques such as digital modulation and packetization, as well as VLSI technology, the fundamentals of television have been reinvented for the digital age.

The first U.S. digital television transmission standard developed for broadcast of high and low definition television by a Grand Alliance of companies has been accepted by the Federal Communications Commission (FCC). High definition digital television broadcasts are typically referred to as HDTV, while low definition digital television broadcasts are generally referred to as SDTV. These terms will be used throughout this application, but are no tied to a particular format or standard. Instead, these terms are used to cover the high and low definition digital television of any coding standard (e.g., such as for VTRs and television).

In 1994 SDTV broadcasts became a reality when the first digital television services, broadcasted via satellite, went on the air. The Digital Satellite Service (DSS) units developed by Thomson Consumer Electronics, etc. have been distributed to more than 1 million homes. The highly sophisticated methods of transmitting and receiving digital television not only produce higher-quality television broadcasts, but also create new services, such as movies on demand, interactive programming, multimedia applications as well as telephone and computer services through the television.

Soon, HDTV will become a reality and join SDTV. Accordingly, in the near future, expect advanced television (ATV) broadcasts which include co-existent broadcasts of HDTV and SDTV. The problem, however, arises in that HDTV signals cannot be decoded by current SDTV decoders or NTSC decoders. (NTSC is the current analog broadcast standard in the U.S.)

The notion of format conversion therefore has become increasingly popular as a way of enabling existing display devices, such as NTSC television and computer monitors, to receive transmitted HD signals by implementing down-conversion technology into existing decoder systems.

The conventional decoding system for obtaining a low-resolution image sequence from an HD transmission, however, suffers from significant drawbacks. Specifically, the conventional format conversion method fully decodes the received HD bitstream, and then down-converts the decoded bitstream by pre-filtering and sub-sampling. Although this conventional technique achieves a high quality low resolution version of the original HD transmission, the cost of implementing this technique is high due to the large memory required to store full-resolution anchor frames during MPEG decoding.

As an alternative, a down-converting technique has been proposed which addressees the memory requirements associated with full-resolution MPEG decoding by first down-converting HD signals to a lower resolution. Here, incoming blocks are subject to down-conversion within the decoding loop so that the down-converted pictures, rather than full-resolution pictures, are stored into the memory as the anchor pictures used for MPEG decoding. The obvious drawback of this alternative is that image reconstruction, which in MPEG video decoding requires prediction from stored anchor pictures, is performed using low resolution pictures. Therefore, the reconstructed images are degraded because an imperfect anchor image is used during motion-compensated prediction (described below). Because this degraded reconstructed image is used to reconstruct subsequent pictures, decoder prediction will "drift" away from the prediction result of the encoder.

To clarify the operation of down-conversion, MPEG encoding/decoding is first discussed. For MPEG video encoding of an HDTV transmission, image blocks of 8×8 pixels in the spatial domain are converted into 8×8 DCT (discrete cosine transform) blocks of coefficients in the DCT or frequency domain. Specifically, in most coding formats such as MPEG, the HDTV signal is divided into a luminance component (Y) and two chroma components (U) and (V). Macro blocks of 8×8 DCT blocks of DCT coefficients are formed.

Besides variable length encoding, MPEG provides for intra- and inter-coding. Intra-coding is where a field or frame of the HDTV signal, referred to as a picture, is encoded based on the pixels therein. Several well known techniques exist for intra-coding. intra-coded picture is typically referred to as an I-picture.

Inter-coding, sometimes referred to as predictive encoding, is where a picture is encoded based on a reference picture, referred to as an anchor picture. In inter-coding, each macro block (i.e., related luminance and chroma blocks) of the picture being encoded is compared with the macro blocks of the anchor picture to find the macro block of the anchor picture providing the greatest correlation therewith. The vector between the two macro blocks is then determined as the motion vector. The inter-coded HDTV signal for the macro block being encoded will then include the motion vector and the differences between the macro block being encoded and the corresponding macro block of the anchor picture providing the greatest correlation.

For example, a series of pictures may have the display order $I_1B_1B_2P_1B_3B_4P_2B_5B_6P_3B_7B_8I_2$ .... The transmitted HDTV signal, however, will have the pictures arranged in the order of encoding as follows: $I_1P_1B_1B_2P_2B_3B_4P_3B_5B_6I_2B_7B_8$. P-pictures are encoded using the previous I-picture or P-picture as the anchor picture. In the above example, P-pictures $P_1$, $P_2$, and $P_3$ were encoded using I-picture $I_1$, P-picture $P_1$, and P-picture $P_2$, respectively, as the anchor picture.

The B-pictures may be forward predicted, backward predicted, or bi-directionally predicted. For instance, if B-picture $B_1$ was encoded using I-picture $I_1$ as the anchor picture, then B-picture $B_1$ is forward predicted. Alternatively, if B-picture $B_1$ was encoded using P-picture $P_1$ as the anchor picture, then B-picture $B_1$ is back or backward predicted. If B-picture $B_1$ was encoded using both I-picture $I_1$ and P-picture $P_1$ (typically an average thereof) as anchor pictures, then B-picture $B_1$ is bi-directionally predicted.

The headers in the HDTV signal indicate whether pictures are I, B, or P-pictures and the direction of encoding. These headers also indicate the group of picture (GOP) size N and the distance between anchor pictures M. The GOP size indicates the distance between I-pictures, which in the above example would be N=12. Since I-pictures and P-pictures are anchor pictures, the distance between anchor pictures in the above example would be M=3. Based on the information provided in the headers, the HDTV signal can be properly decoded.

Therefore, if inter-coding was used to encode an incoming frame, an inverse DCT operation performed at the decoding end outputs only the difference (residual) between the present picture and a previous picture. To produce a complete picture requires additional structure, including a device for performing motion-compensated prediction ("motion compensation"), which produces predicted values to be subsequently added to the residual from stored anchor pictures.

FIG. 15 illustrates a conventional apparatus for decoding and down-converting an incoming HD bitstream. A variable length decoder (VLD) and dequantizer (IQ) 10 receives an incoming HD transmission, performs variable length decoding on the MPEG encoded video signals, and dequantizes the resulting DCT coefficients to produce arrays of dequantized DCT coefficients. The resulting DCT coefficient blocks are then converted to the spatial domain by an inverse discrete cosine transformer (IDCT) 14. A picture store 22 stores the two previous anchor pictures (e.g., I or P-pictures).

A motion compensated prediction unit 20 will receive at least one anchor picture from the picture store 22 and output the macroblocks of the anchor picture pointed to by the motion vector. An adder 18 receives the resulting macroblocks, and also receives the output of the IDCT 14. Consequently, when a B or P-picture is being down-converted, a complete picture can be obtained by adding the output of the IDCT 14, which represents residual data, and the values resulting from the motion compensated prediction unit 20 to create a complete picture. When an I-picture is output from the IDCT 14, there is no need to add anchor picture information thereto. Consequently, the motion compensator 20 will not send output to the adder 18, and the output of the adder 18 will be the output of the IDCT 14.

The output of the adder 18 is then received by a down-converter 12, which pre-filters and sub-samples the full resolution pictures output by the adder 18 to achieve a low resolution version of the decoded HDTV transmission. Next, after the decoded pictures are down-converted, they are sent to a reformatter 24. Since the transmission, and consequently the reception order, of the pictures is not in the proper display order, the reformatter 24 reformats the order of the pictures into the proper display order.

To better understand the operation of the apparatus illustrated in FIG. 15, assume that an HDTV signal such as that discussed above is received. Therefore, I-picture $I_1$ will be converted to the spatial domain by the IDCT 14 and output via the adder 18 without any information having been added thereto. Since an I picture is an anchor picture, the picture store 22 will store the output of the adder 18. After down-conversion by the down-converter 12, the reformatter 24 will then determine what output should be sent as the SDTV signal. The reformatter operates according to the following rules: (1) if the picture received is the first anchor picture received, then no output will be sent; (2) if the picture received is an anchor picture but not the first anchor picture received, then the previously received anchor picture will be output; and (3) if the picture received is a B-picture, then the B-picture will be immediately output.

Therefore, upon receipt of I-picture $I_1$, the reformatter 24 will not send any output. The next picture received will be P-picture $P_1$. The adder 18 will then receive the output of IDCT 12 and macroblocks from the I-picture $I_1$ pointed to by the motion vectors. Consequently, the adder 18 will generate a complete picture. Since this complete picture is an anchor picture, the picture store 22 will then store the complete picture $P_1$. According to the rules discussed above, the reformatter 24 will then output the I-picture $I_1$ (i.e., the previous anchor picture).

The next two pictures received are B-pictures $B_1$ and $B_2$. Complete pictures will be formed from these B-pictures in the same manner discussed above with respect to P-picture $P_1$, except that, depending on the direction of encoding, either the I-picture $I_1$ and/or the P-picture $P_1$ will be used as the anchor picture. Since the adder 18 outputs a B-picture, the reformatter 24 will immediately output the B-picture. Consequently, the output from the reformatter 24 will be $I_1B_1B_2$.

Next, the P-picture $P_2$ is received and processed in the same manner as P-picture $P_1$. When the adder 18 outputs the complete P-picture $P_2$, the frame store 22 will replace the I-picture $I_1$ with the P-picture $P_2$. The reformatter 24, according to the rules discussed above, will then output the P-picture $P_1$. In this manner, the reformatter 24 will output the pictures in the proper display order.

As mentioned above, although the conventional system for decoding and down-converting incoming HDTV signals achieves a quality low resolution result, this system cannot be implemented unless the decoder is provided with sufficient memory to store two full-resolution anchor pictures. Such memory capacity renders the cost of the conventional decoder quite high. The alternative proposed decoder and down-conversion system on the other hand, in which low-resolution anchor pictures are stored for MPEG decoding, does not ensure that optimal low-resolution motion compensation is achieved.

SUMMARY OF THE INVENTION

An object of the present invention is to eliminate the disadvantages and problems experienced by the conventional decoding and down-conversion techniques discussed above.

A further object of the present invention is to provide a method and apparatus for decoding a HDTV transmission which, depending on the memory capacity of the decoder, operates in one of three different modes: Full memory, Half Memory, and Quarter Memory while minimizing the circuit complexity required by the decoder to operate in each of these modes.

Another object of the present invention is to provide a method and apparatus for achieving a low resolution image sequence from a HD bitstream in which the filtering process utilized to perform motion compensated prediction with low-resolution anchor frames is optimized.

These and other objects are achieved by an apparatus for decoding a digital signal, comprising: composite picture forming means for forming a composite picture from a first digital video signal and a second digital video signal, said first digital video signal including inter-coded picture data; down-converting means for receiving a third digital video signal, for outputting said third digital video signal to said composite picture forming means as said first digital signal in a first mode, for down-converting said third digital video signal into a fourth digital video signal in a second mode, and outputting said fourth digital video signal to said composite picture forming means in said second mode; a memory for storing anchor pictures output from said composite picture forming means; and motion compensation means for generating said second digital signal based on said stored anchor pictures.

These and other objects are also achieved by a method for decoding a digital signal, comprising: forming a composite picture from a first digital video signal and a second digital video signal using a composite picture forming means, said first digital video signal including inter-coded picture data; receiving a third digital video signal; outputting said third digital video signal to said composite picture forming means as said first digital signal in a first mode; down-converting said third digital video signal into a fourth digital video signal in a second mode; outputting said fourth digital video signal to said composite picture forming means in said second mode; storing anchor pictures output from said composite picture forming means; and generating said second digital signal based on said stored anchor pictures.

Other objects, features, and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

BRIEF DESCRIPTION OF THE DRAWINGS

FIG. 5A illustrates the post-decoding processing for the apparatus of FIG. 1 operating in the full memory decoder mode;

FIG. 5B illustrates the post-decoding processing for the apparatus of FIG. 1 operating in the half memory decoder mode;

FIG. 5C illustrates the post-decoding processing for the apparatus of FIG. 1 operating in the quarter memory decoder mode;

FIGS. 6A–6C illustrate horizontal and vertical down conversion;

DETAILED DESCRIPTION OF THE PREFERRED EMBODIMENTS

Three-Level Decoding

Figure 1:
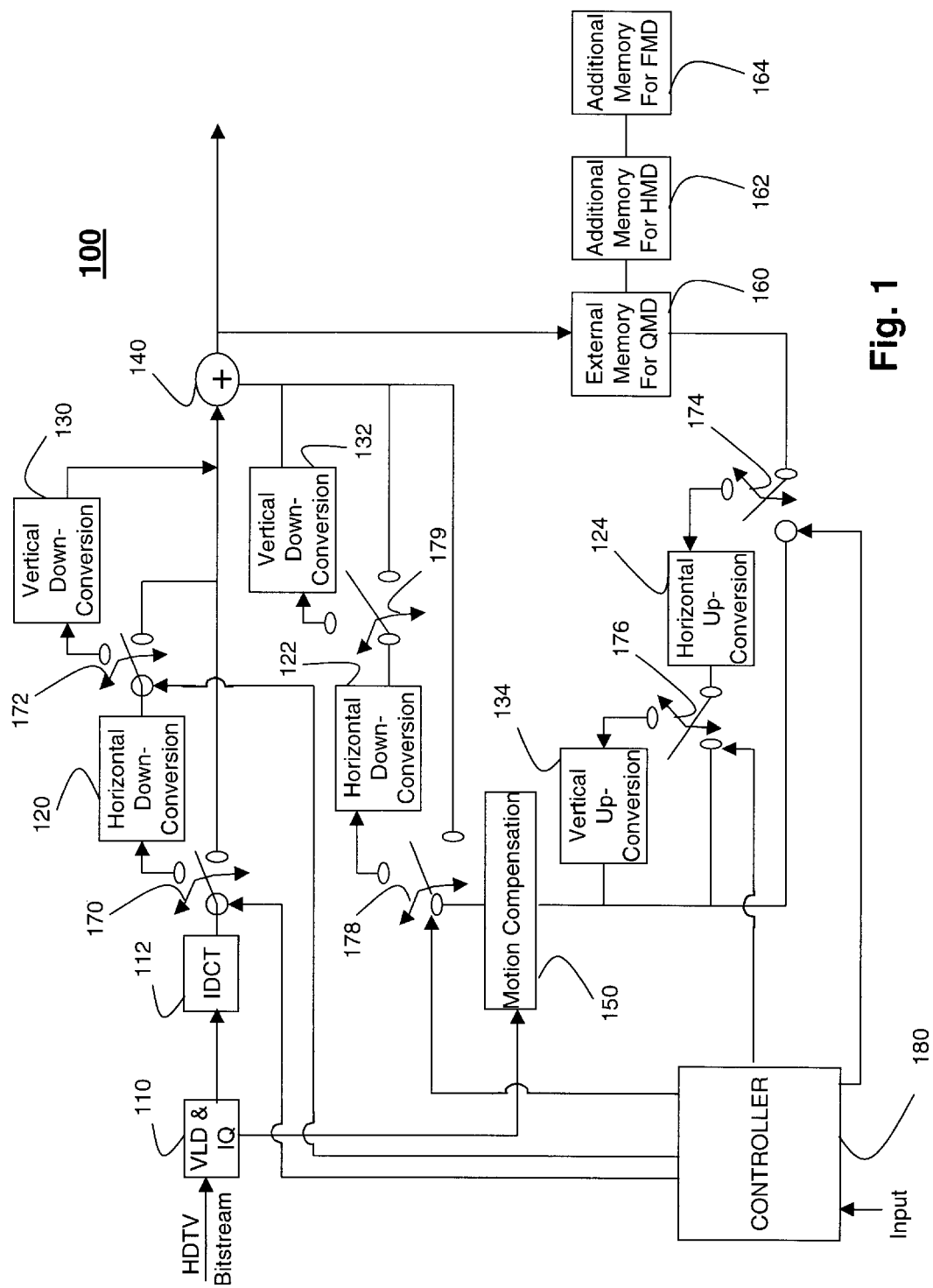
FIG. 1 illustrates an apparatus, according to the present invention, for decoding and down-converting incoming High Definition Television signals, which operates in one of three decoding modes.

FIG. 1 illustrates an apparatus, according to the present invention, for decoding and down-converting HDTV signals which operates in three possible modes: Full-Memory Decoder (FMD) mode, Half-Memory Decoder (HMD) mode, and Quarter-Memory Decoder (QMD) mode. As shown in FIG. 1, the apparatus includes a variable length decoder (VLD) & dequantizer (IQ) 110, such as described above, which receives an HDTV signal of any particular format. The VLD and IQ 110 variable length decodes the incoming bitstream and dequantizes the resulting DCT domain coefficients to output 8×8 arrays of dequantized DCT coefficients. The VLD & IQ 110 also extracts motion vectors from the received bitstream and outputs these motion vectors to a motion compensator 150.

An inverse discrete cosine transformer (IDCT) 112 receives the DCT domain output of the VLD & IQ 110 and performs an inverse DCT operation to convert DCT blocks received from the VLD & IQ 110 into the spatial domain.

A first switch 170 receives the output of the IDCT 112. In FMD mode, described in detail below with reference to FIG. 2, the first switch 170 routes the received spatial data to an adder 140. In HMD and QMD modes, each described in detail below with reference to FIGS. 3 and 4 respectively, the first switch 170 routes the received spatial data to a first horizontal down-converter 120.

In HMD and QMD modes, the first horizontal down-converter 120 decimates the spatial blocks output by the IDCT 112 to achieve reduced resolution data. The operation of a particular horizontal down-conversion scheme will be discussed in detail below.

When the apparatus of FIG. 1 operates in either HMD mode or QMD mode, a second switch 172 receives the output of the first horizontal down-converter 120. In HMD mode, the second switch 172 routes the output of the first horizontal down-converter 120 to the adder 140. In QMD mode, the second switch 172 routes the output of the first horizontal down-converter 120 to a first vertical down-converter 130.

In QMD mode, the first vertical down-converter 130 receives the output of the first horizonal down-converter 120 and vertically decimates the incoming spatial blocks which are then output to the adder 140. The operation of a particular vertical down-conversion scheme is discussed in detail below.

A first external memory 160, a second external memory 162, and a third external memory 164 store anchor pictures output from the adder 140 (for I and P pictures only). These anchor pictures are used in subsequent motion-compensated predictive decoding ("motion compensation"). It is noted that, by showing the decoder memory in FIG. 1 as having a plurality of discrete memory units 160, 162, and 164, this illustration is merely intended to represent the various decoder memory capacities which are necessary for each mode of decoder operation. For example, the combination of the first external memory 160, the second external memory 162, and the third external memory 164 represents sufficient memory capacity for storing full-resolution anchor pictures, and thus represents the minimum memory capacity for the FMD mode. The combination of the first external memory 160 and the second external memory 162 represents sufficient memory capacity for storing half-resolution anchor pictures, and thus represents the minimum memory capacity for HMD mode. Finally, the single external memory 160 represents the decoder memory capacity for quarter resolution anchor pictures, and thus represents the minimum amount of memory for QMD mode.

In FMD mode, a third switch 174 receives anchor picture data retrieved from the first external memory 160, the second external memory 162, and the third external memory 164, and routes the anchor picture data to the motion compensator 150. In HMD mode, the third switch 174 receives anchor picture data from the first external memory 160 and the second external memory 162 and routes the anchor picture data to a horizontal up-converter 124. In QMD mode, the third switch 174 receives anchor picture data from the first external memory 160 and routes the anchor picture data to the horizontal up-converter 124.

In HMD and QMD modes, the horizontal up-converter 124 receives the anchor picture data routed by the third switch 174, and upsamples the lower resolution data in the horizontal direction. As will be discussed in detail below, the horizontal up-converter 124 preferably utilizes an up-conversion filter which is the Moore-Penrose inverse of the horizontal down-conversion filter used by the first horizontal down-converter 120.

In HMD mode, a fourth switch 176 receives the output of the horizontal up-converter 124 and routes the output of the horizontal up-converter 124 to the motion compensator 150. In QMD mode, the fourth switch 176 receives the output of the horizontal up-converter 124 and routes the output of the horizontal up-converter 124 to a vertical up-converter 134. In QMD mode, the vertical up-converter 134 receives the data routed by the fourth switch 176, and upsamples the lower resolution data in the vertical direction. As will discussed in detail below, the vertical up-converter 134 preferably utilizes an up-conversion filter which is the Moore-Penrose inverse of the vertical down-conversion filter used by the first vertical down-converter 130.

In FMD mode, the motion compensator 150 directly receives the output of the first external memory 160, the second external memory 162, and the third external memory 164. In HMD mode, the motion compensator 150 directly receives the output of the horizontal up-converter 124. In QMD, the motion compensator directly receives the output of the vertical up-converter 134. In each decoding mode, the motion compensator 150 performs motion compensated prediction using anchor pictures retrieved from the external memory and high definition (HD) motion vectors received from the VLD & IQ 110. As will be discussed in more detail below, the motion compensator 150, in each decoding mode, performs motion compensated prediction in accordance with a conventional scheme such the MPEG2 standard.

In FMD mode, a fifth switch 178 receives the output of the motion compensator 150 and routes the output of motion compensator 150 to the adder 140. In HMD and QMD modes, the fifth switch 178 receives the output of the motion compensator 150 and routes the output of motion compensator 150 to a second horizontal down-converter 122.

In HMD and QMD modes, the second horizontal down-converter 122 receives the data routed by the fifth switch 178, and horizontally down converts this routed data as discussed above in reference to the first horizontal down-converter 120.

In HMD mode, a sixth switch 179 receives the output of the horizontal down-converter 122 and routes the data output from the second horizontal down-converter 122 to the adder 140. In QMD mode, the sixth switch 179 receives the output of the horizontal down-converter 122 and routes the data output from the second horizontal down-converter 122 to a second vertical down-converter 132.

In QMD mode, the second vertical down-converter 132 receives the data routed by the sixth switch 179, and vertically down converts this routed data as discussed above in reference to the first vertical down-converter 132.

In FMD mode, for a B picture or a P picture, the adder 140 receives motion compensated prediction data directly from the motion compensator 150 and adds the output of motion compensator 150 to the residual data output by the IDCT 112. In HMD mode, for a B picture or a P picture, the adder 140 directly receives the output of the second horizontal down-converter 122, and adds the output of the second horizontal down-converter 122 to the residual data output by the first horizontal down-converter 120. In QMD mode, for a B picture or a P picture, the adder 140 directly receives the output of the second vertical down-converter 132 and adds the output of the second vertical down-converter 132 to the residual data output by the first vertical down-converter 130.

The picture output by the adder 140 is both output for display and sent to the first external memory 160, the second external 162, and the third external 164 (for I and P-pictures).

As FIG. 1 and the above discussion demonstrate, three operating modes are incorporated into a single decoder arrangement, each operating mode utilizing the same core processing units. The positioning of the first switch 170, the second switch 172, the third switch 174, the fourth switch 176, the fifth switch 178, and the sixth switch 179 determine whether the HDTV decoding apparatus of FIG. 1 operates in the FMD, HMD, or QMD mode. Furthermore, as discussed above, the operating mode of the decoder of FIG. 1 is generally dictated by the memory capacity of the decoder. Specifically, when the decoder has sufficient memory to store full-resolution anchor pictures, the decoder will generally operate in FMD mode because this decoding mode provides the highest quality output. If he decoder only has sufficient memory to store half-resolution anchor pictures, the decoder will generally operate in HMD mode. Finally, if the decoder only has sufficient memory to store quarter-resolution anchor pictures, the decoder must operate in QMD mode.

As illustrated in FIG. 1, the scaleable decoder according to the present invention includes a controller 180 which outputs control signals to each of the first switch 170, the second switch 172, the third switch 174, the fourth switch 176, the fifth switch 178, and the sixth switch 179 to set the positioning of these switches in accordance with the decoder operating mode. As discussed above, the operating mode is generally dictated by the memory capacity of the decoder. When the decoder mode is set solely on the basis of the memory capacity, the input to the controller 180 is an indication of the memory capacity of the decoder. Alternately, a user may select a particular operating mode, and this selection may serve as the input to controller 180. Still further, an indication of the type of display device attached to the decoder 100 may serve as the input of the controller 180 to set the mode of operation.

FMD Mode

Figure 2:
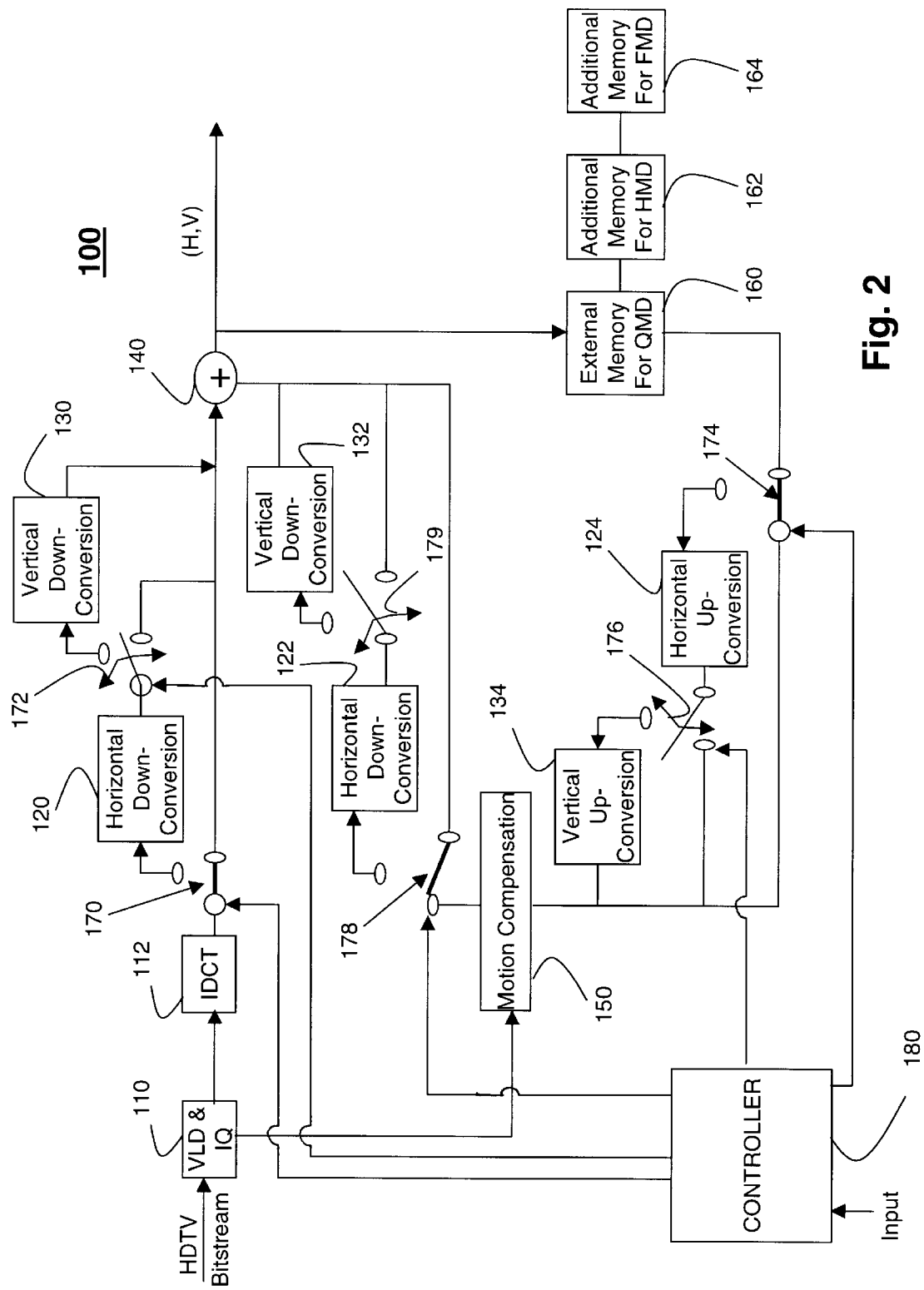
FIG. 2 illustrates the apparatus of FIG. 1 operating in the full memory decoder mode.

FIG. 2 illustrates the state of the above-described switches, as set by the controller 180, when the decoder of FIG. 1 operates in FMD mode. As mentioned above, this mode requires sufficient memory capacity to store full-resolution anchor pictures. In FIG. 2, this memory capacity is illustrated for convenience as the combination of the first external memory 160, the second external memory 162, and the third external memory 164.

Controller 180 positions the first switch 170 so that the adder 140 directly receives the output of the IDCT 112, thus by-passing the first horizontal down-converter 120 and the first vertical down-converter 130. Controller 180 positions the second switch 174 so that the anchor picture data stored in the first external memory 160, the second external memory 162, and the third external memory 164 is directly sent to the motion compensator 150, thereby by-passing the horizontal up-converter 124 and the vertical up-converter 134. Similarly, the controller 180 positions the fifth switch 178 so that the output of the motion compensator 150 is directly received by the adder 140, thereby by-passing the second horizontal down-converter 122 and the second vertical down-converter 132.

When the decoder has sufficient memory to operate in FMD mode, decoding is relatively straight forward. The VLD and IQ 110 variable length decodes the incoming MPEG bitstream and dequantizes the resulting DCT domain coefficients to reconstruct 8×8 arrays of dequantized DCT coefficients. The VLD & IQ 110 also extracts motion vectors from the received bitstream. The IDCT 112 then performs an inverse discrete cosine transform on the DCT coefficients resulting from the VLD & IQ 110 to output spatial data blocks. As discussed above, in the case of Intra-coding (I-pictures), the IDCT 112 yields a reconstructed block, and in the case of Inter-coding (B-picture or P-picture), the IDCT 112 yields a residual block. When the IDCT 112 yields a residual block, a reconstructed block must be produced by adding the residual block to prediction data produced by the motion compensator 150 in accordance with HD motion vectors and either a single anchor picture or multiple anchor pictures (for bi-directionally predicted pictures) stored in the first external memory 160, the second external memory 162, and the third external memory 164.

Although the decoder illustrated in FIG. 2 achieves a reconstructed HD output, represented as (H, V), where H represents full horizontal resolution and V represents full vertical resolution, the decoded pictures must be subsequently processed to conform with the type of display provided ("native display"). The general post-decoding processing for FMD mode is illustrated in FIG. 5A.

In FMD mode, high definition reconstructed image signals are output by the decoder 100. Once this high-resolution data is obtained, three different levels of actual display resolution are possible. For example, when the native display is a high definition display (level 3 display), the high resolution reconstructed pictures from the decoder 100 are sent to a high resolution display processor 406. The high resolution display processor 406 receives the reconstructed high resolution frames from the decoder 100, and reformats the received pictures in a manner discussed above so that the frames are displayed in the proper order, and performs any necessary size and picture-rate conversion required for the particular display device.

When the display device is a lower resolution display such as a computer monitor (level 2 display), a horizontal subsampler 402 receives the full resolution image signals (H, V), horizontally pre-filters and subsamples the received picture signals, and outputs the resulting signals (1/2 H, V) to a medium resolution display processor 408. The medium resolution display processor 408 then reformats the received pictures in a manner discussed above so that the pictures are displayed in the proper order, and performs any necessary size and picture-rate conversion required for the particular display device.

When the native display is a standard definition (SD) display (level 1 display), a vertical subsampler 404 receives image signals (1/2 H, V) from the horizontal subsampler 402, vertically pre-filters and subsamples the received image signals, and outputs the resulting image signals (1/2 H, 1/2 V) to a low resolution display processor 410. The low resolution display processor 410 then reformats the received pictures in a manner discussed above so that the pictures are displayed in the proper order, and performs any necessary size and picture-rate conversion required for the particular display device.

HMD Mode

Figure 3:
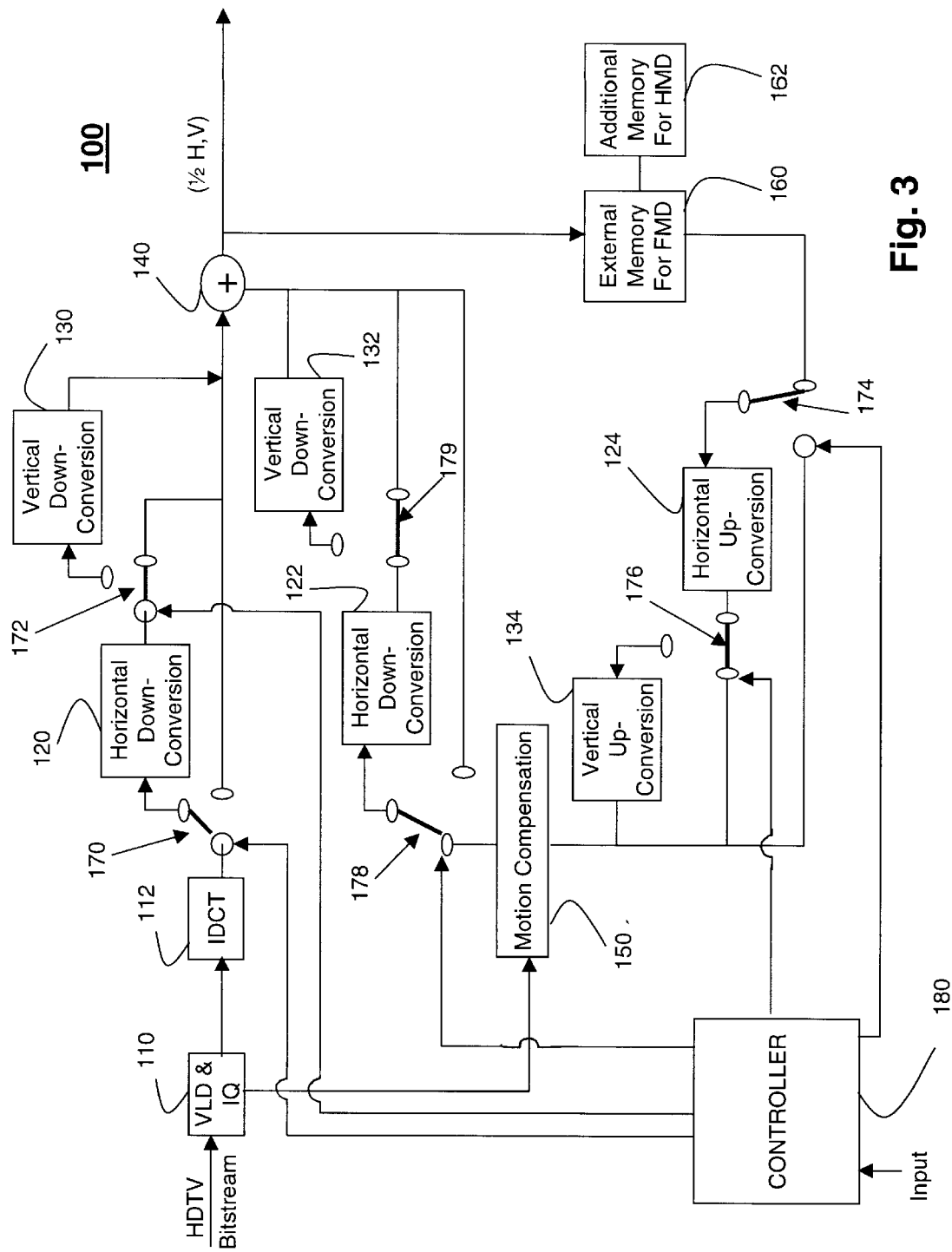
FIG. 3 illustrates the apparatus of FIG. 1 operating in the half memory decoder mode.

FIG. 3 illustrates the state of the first switch 170, the second switch 172, the third switch 174, the fourth switch 176, the fifth switch 178, and the sixth switch 179, as set by the controller 180, necessary for the decoder of FIG. 1 to operate in HMD mode. As discussed above, to enable HMD mode, the decoder must have sufficient memory to store half-resolution anchor pictures. This memory capacity is illustrated for convenience as the combination of the first external memory 160 and the second external memory 162.

The controller 180 positions the first switch 170 so that the output of the IDCT 112 is routed to the first horizontal down-converter 120. The controller 180 positions the second switch 172 so that the adder 140 directly receives the output of the first horizontal down-converter 120, thereby by-passing the first vertical down-converter 130. The controller 180 positions the third switch 174 so that the data retrieved from the first external memory 160, and the second external memory 162 is routed to the horizontal up-converter 124. The controller positions the fourth switch 176 so that the output of the horizontal up-converter 124 is routed to the motion compensator 150, thereby by-passing the vertical up-converter 124. The controller 180 positions the fifth switch 178 so that the output of the motion compensator 150 is routed to the second horizontal down-converter 122. The controller 180 positions the sixth switch 179 so that the output of the second horizontal down-converter 122 is routed to the adder 140, thereby by-passing the second vertical down-converter 132.

To operate in HMD mode, the decoder has sufficient memory to store half-resolution anchor pictures. While the decoder operating in HMD mode requires additional processing elements, the same core circuitry used in FMD mode, with the addition of the first horizontal down-converter 120, the horizontal up-converter 124, and the second horizontal down-converter 122 is used. These additional units are incorporated into the decoding operation by the positions of the first switch 170, the second switch 174, and the third switch 178 as set by the controller 180 in a manner discussed above.

The post-decoding processing for the HMD mode is discussed with reference to FIG. 5B. In HMD mode, image signals which have been horizontally down-converted, represented as (1/2 H, V), are output by the decoder 100. With this decoder mode, two levels of display resolution are possible. As compared to the FMD mode, image signals resulting from HMD mode cannot be displayed on a high definition display (level 3 display).

When the native display is a level 2 display, such as a computer monitor, the (1/2 H, V) reconstructed image pictures from the decoder 100 are sent directly to the medium resolution display processor 408.

Alternatively, when the native display is a SD resolution display (level 1 display), the vertical subsampler 404 receives the image signals (1/2 H, V), vertically pre-filters and subsamples the received image signals, and outputs the resulting image signals (1/2 H, 1/2 V) to the low resolution display processor 408. The low resolution display processor 408 processes the received image signals (1/2 H, 1/2 V) a manner discussed above so that the pictures are displayed in the proper order, and performs any necessary size and picture-rate conversion required for the particular display device.

QMD Mode

Figure 4:
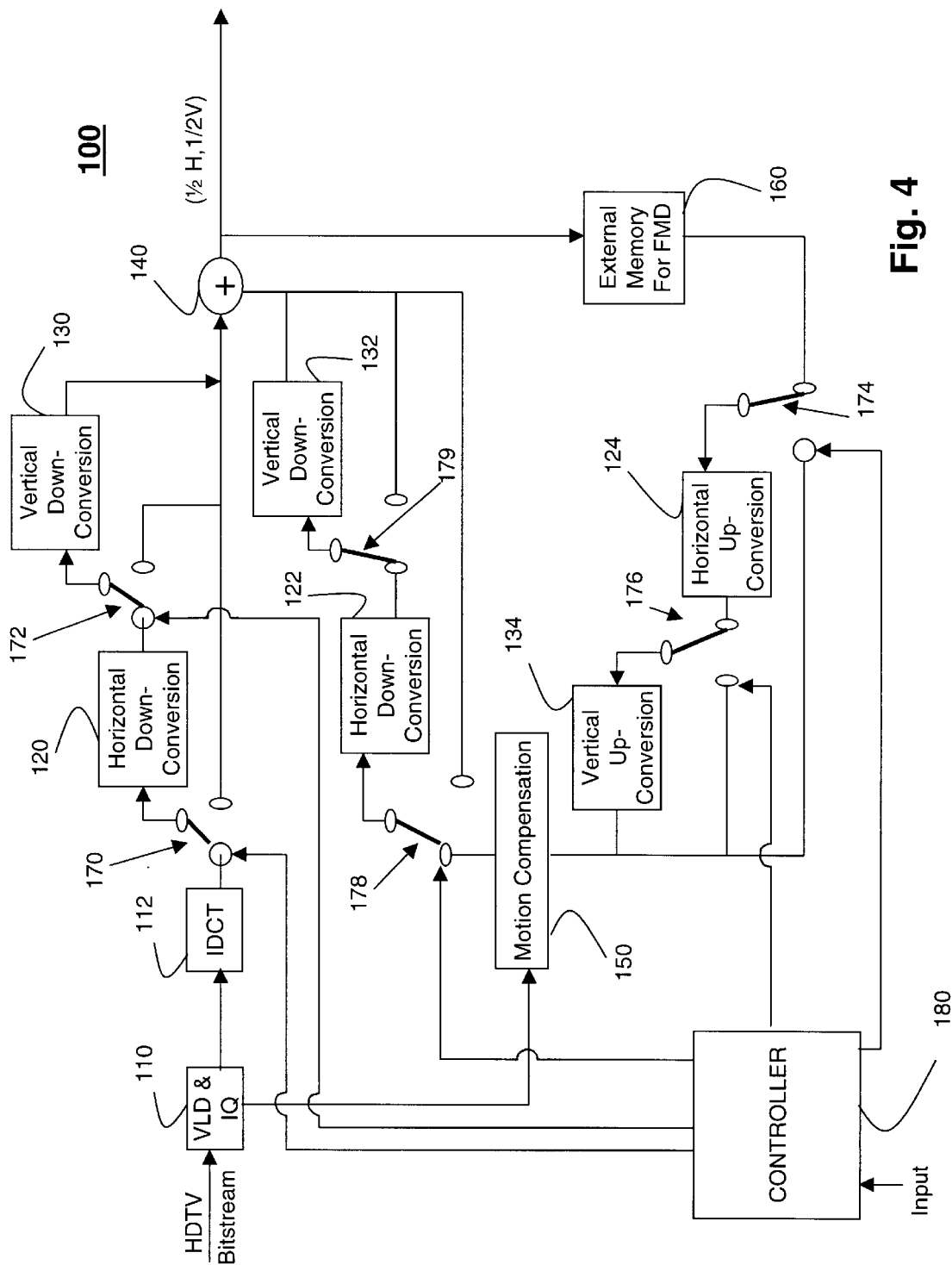
FIG. 4 illustrates the apparatus of FIG. 1 operating in the quarter memory decoder mode.

FIG. 4 illustrates the state of the first switch 170, the second switch 172, the third switch 174, the fourth switch 176, the fifth switch 178, and the sixth switch 179, as set by the controller 180, when the apparatus of FIG. 1 operates in QMD mode. As discussed above, the decoder must operate in QMD mode when the memory capacity of the decoder is such that only quarter resolution anchor pictures can be stored.

The controller 180 positions the first switch 170 so that the output of the IDCT 112 is routed to the first horizontal down-converter 120. The controller 180 positions the second switch 172 so that the output of the first horizontal down-converter 120 is routed to the first vertical down-converter 130. The controller 180 positions the third switch 174 so that the data retrieved from the first external memory 160 is routed to the horizontal up-converter 124. The controller 180 positions the fourth switch 176 so that the output of the horizontal up-converter 124 is routed to the vertical up-converter 134. The controller 180 positions the fifth switch 178 so that the output of the motion compensator 150 is routed to the second horizontal down-converter 122. The controller 180 positions the sixth switch 179 so that the second vertical down-converter 132 receives the output of the second horizontal down-converter 122.

For the decoder of FIG. 1 to operate in QMD mode, the decoder requires only enough memory to store quarter resolution anchor pictures. In other words, anchor pictures which have been decimated in both the horizontal and vertical directions are stored. For ease of explanation, this amount of memory is illustrated as the first external memory unit 160.

As compared to HMD mode, the decoder requires additional processing units to operate in QMD mode. Specifically, the first vertical down-converter 130, the vertical up-converter 134, and the second vertical down-converter 132 are incorporated into the decoding operation by the positions of the second switch 172, the fourth 176, and the sixth switch 179, as set by the controller 180 in a manner described above.

The post-decoding processing for the QMD mode is discussed with reference to FIG. 5C. In QMD mode, image signals which have been both horizontally and vertically down-converted, represented as (1/2 H, 1/2 V), are output by the decoder 100. With this image resolution, only one display resolution is possible. As compared to the QMD mode, image signals from the HMD mode cannot be displayed on a level 3 or level 2 display.

When the native display is a level 1 display, such as an SD television display, the (1/2 H, 1/2 V) reconstructed image frames from the decoder 100 are sent directly to the low resolution display processor 410, which operates as discussed above.

As the above discussion illustrates, each of the three decoding modes, FMD, HMD, and QMD, utilize the same core elements—the VLD & IQ 110, the IDCT 112, the adder 140, the first external memory 160, and the motion compensator 150. Therefore, three levels of decoding are achieved while minimizing the complexity of the decoding apparatus. In order to achieve this efficient implementation, horizontal and vertical down/up-conversion are performed separately.

Furthermore, the scaleable decoder according to the present invention may be realized with modifications to the apparatus illustrated in FIG. 1. One such modification is illustrated in FIG. 14.

Figure 14:
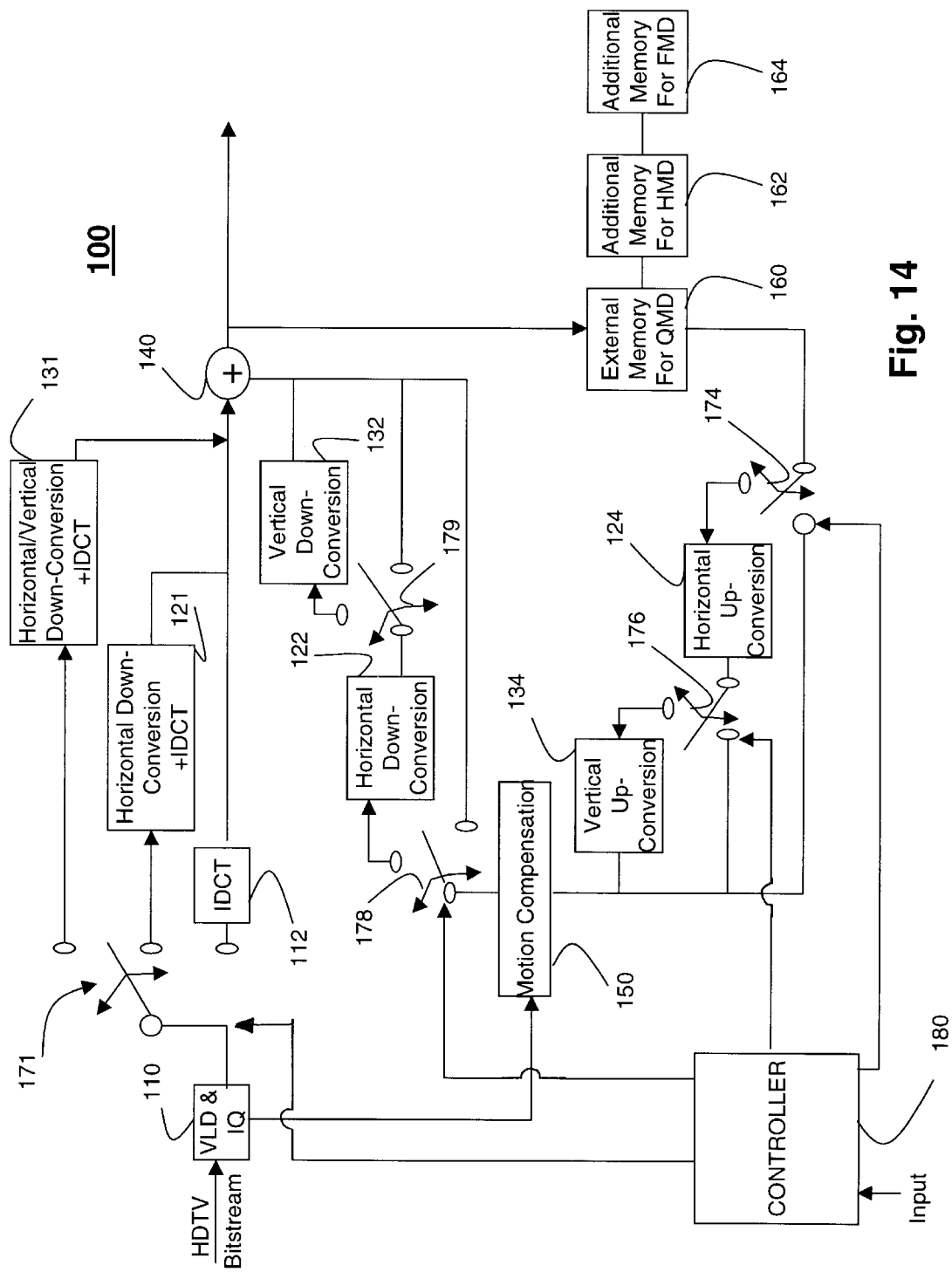
FIG. 14 illustrates an alternative embodiment to the decoder illustrated in FIG. 1 according to the present invention.
Figure 15:
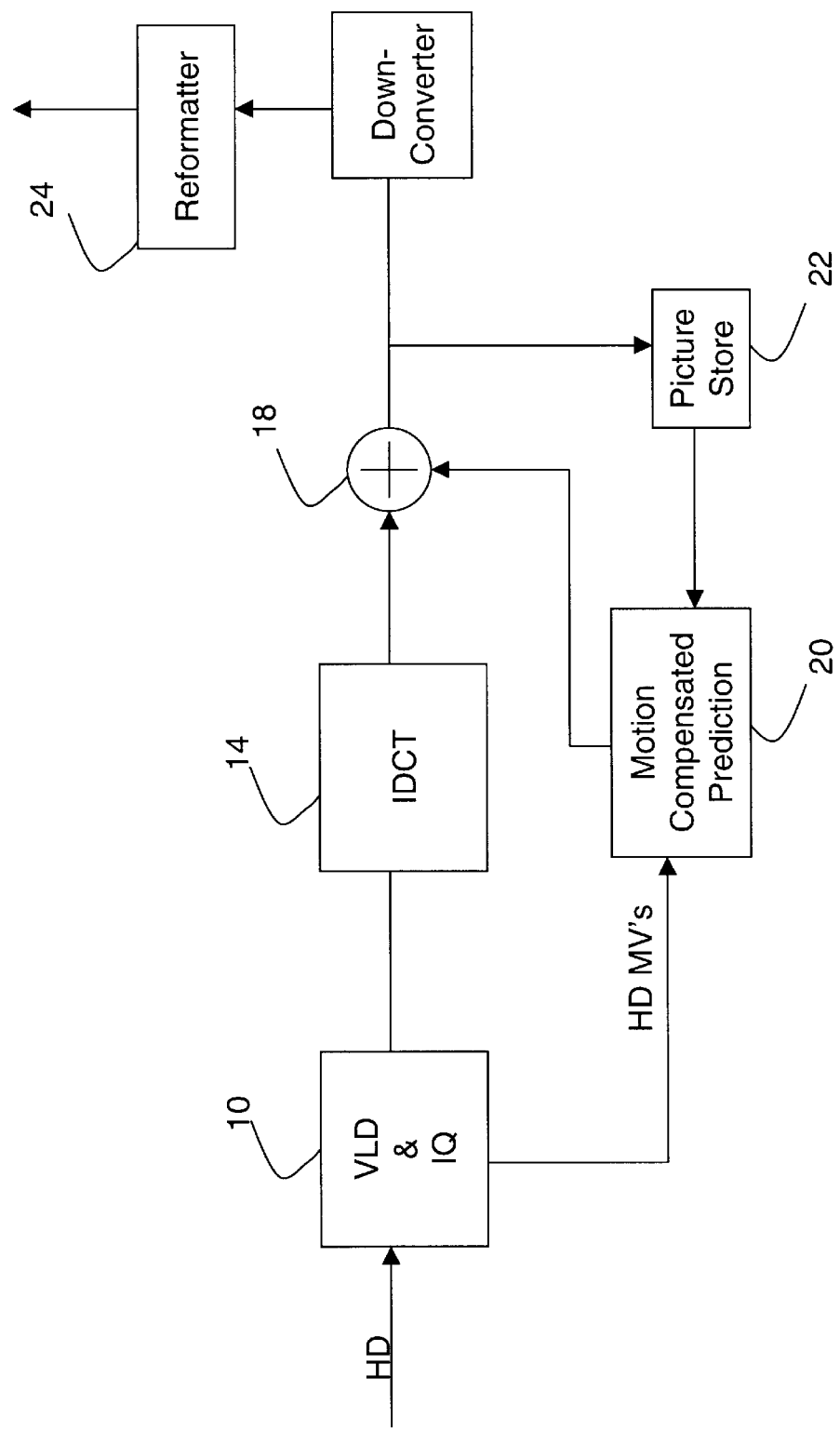
FIG. 15 illustrates a conventional system for decoding and down-converting High Definition Television signals.

In FIG. 14, instead of the first switch 170 and the second switch 172, a three-position switch 171 controls whether the data sent to the adder 140 is high resolution or reduced resolution data. Specifically, in FMD mode, the controller 180 positions the three-position switch 171 to route the dequantized DCT coefficients from the VLD & IQ 110 to the IDCT 112 .

In HMD mode, the controller 180 positions the three-position switch 171 to route the dequantized DCT coefficients from the VLD & IQ 110 to a combined horizontal down-conversion and IDCT unit 121. In HMD mode, the combined horizontal down-conversion and IDCT unit 121 performs both an inverse discrete cosine transform on the DCT coefficients received from the VLD & IQ 110 and a horizontal down-conversion.

In QMD mode, the controller 180 positions the three-position switch 171 to route the dequantized DCT coefficients from the VLD & IQ 110 to a combined horizontal/vertical down-conversion and IDCT unit 131. In QMD mode, the combined horizontal/vertical down-conversion and IDCT unit 131 performs both an inverse discrete cosine transform on the received DCT data and horizontal and vertical down-conversion.

Figure 12:
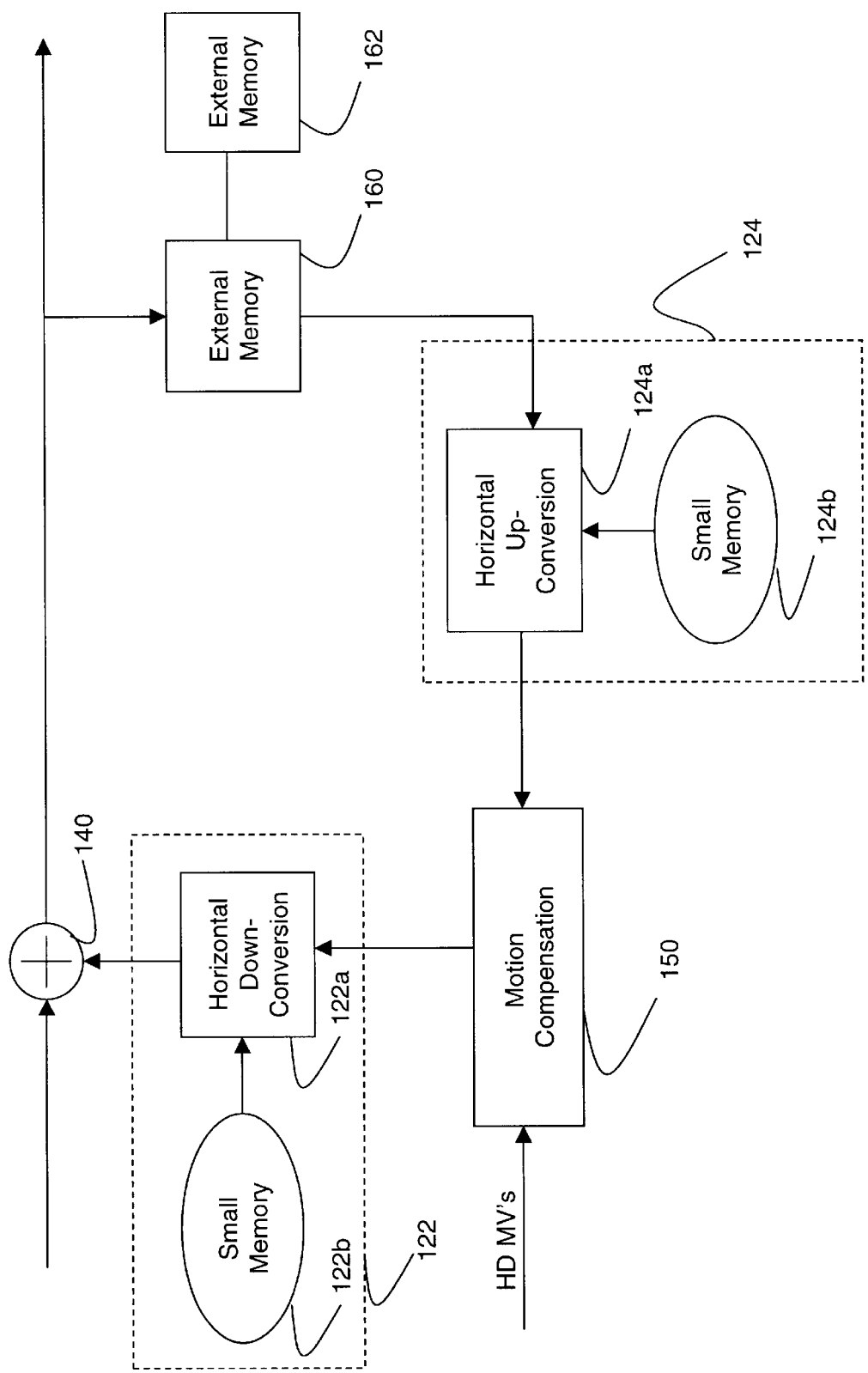
FIG. 12 illustrates the decoder elements which perform motion compensation in the half memory decoder mode.

In this alternative embodiment, the operations of horizontal down-conversion and inverse DCT are combined into one processing element 121 for HMD mode, and the operations of horizontal down-conversion, vertical down-conversion, and inverse DCT are combined into one processing element 131 for QMD mode. The remaining elements of the alternative embodiment illustrated in FIG. 12 are the same as those illustrated in FIG. 1. In this alternative embodiment, the combined horizontal down-conversion and IDCT unit 121 performs both horizontal down-conversion and the inverse DCT in one operation, rather than two cascaded operations as was the case for the embodiment illustrated in FIG. 1. Similarly, the combined horizontal/vertical down-converter and IDCT unit 131 combines the inverse DCT, horizontal down-conversion, and vertical down-conversion processes into one operation. Accordingly, this alternative embodiment realizes certain computational savings over the embodiment illustrated in FIG. 1.

While the apparatus of FIG. 1 can be realized using any down/up conversion scheme which operates separably in the horizontal and vertical directions, the following discussion specifies a particular down-conversion embodiment. This particular down-conversion scheme is based on a process called "frequency synthesis," which is described in copending application Ser. No. 08/648,358 filed May 15, 1996 and titled "Method and Apparatus for Down-Converting a Digital Signal," co-pending application Ser. No. 08/741,714 filed Oct. 31, 1996 and titled "Digital Video Format Converter and Method Therefor," and co-pending application Ser. No. 08/742,124 filed Oct. 31, 1996 and titled "Digital Video Decoder and Method of Decoding a Digital Video Signal," which are all hereby incorporated by reference in their entirety.

Horizontal Down Conversion

Down conversion traditionally consists of two steps. Generally, the image is first filtered by using an anti-aliasing low-pass filter (pre-filtering). The filtered image is then downsampled by a desired factor to achieve a down-converted image. The operation of frequency synthesis performs both the operations of pre-filtering and downsampling in the DCT domain.

Although frequency synthesis filters could be used to perform down-conversion in the presently disclosed embodiments, in the process described below, the spatial equivalents to DCT domain based filters are used to perform down-conversion.

This horizontal down-conversion scheme, which may be used by the first and second horizontal down-converters 120 and 122 of the decoder illustrated in FIG. 1, is described with reference to FIG. 6A, in which $A_1$ and $A_2$ represent two horizontally adjacent 8×8 DCT blocks, and $\acute{A}$ represents a temporary 8×16 DCT block. In the following equations, capital letters are generally used to represent values in the DCT domain, whereas lower case letters are generally used to represent values in the spatial domain.

Initially, for a spatial domain expression $$a'(i,j) = \begin{cases} a_1(i,j); & 0 \le i \le 7, 0 \le j \le 7 \\ a_2,(i,j-8) & 0 \le i \le 7, 8 \le j \le 15 \end{cases} \quad (1)$$

where a' represents a block of spatial data which includes horizontally adjacent 8×8 spatial blocks $a_1$ and $a_2$, the 2D-DCT is given by, $$\acute{A}(k,l) = \sum_{i=0}^{M-1}\sum_{j=0}^{N-1} \acute{a}(i,j)\Psi_k^M(i)\Psi_l^N(j); \; 0 \le k \le M-1 \quad (2)$$

$$0 \le l \le N-1$$

where, $\acute{A}$ represents a temporary block of DCT coefficients having M rows and N columns, $$\Psi_k^M(i) = \sqrt{\frac{2}{M}} \propto (k)\cos\left(\frac{2i+1}{2M}k\pi\right); \quad (3)$$

$$\Psi_l^N(j) = \sqrt{\frac{2}{N}} \propto (l)\cos\left(\frac{2j+1}{2N}l\pi\right)$$

and (k), (l)=1/√2 for k,l=0, and 1 for k,l≠0. Substituting equation (1) into equation (2) yields, $$\acute{A}(k,l) = \sum_{i=0}^{7}\sum_{j=0}^{7} a_1(i,j)\cdot\Psi_k^8(i)\cdot\Psi_l^{16}(j) + \sum_{i=0}^{7}\sum_{j=0}^{7} a_2(i,j)\cdot\Psi_k^8(i)\cdot\Psi_l^{16}(j-8) \quad (4)$$

Changing the order of summation, the spatial blocks in equation (4) can be expressed in the DCT domain using the inverse relation of equation (2), and thus:

$$\acute{A}(k,l) = \sum_{p=0}^{7}\sum_{q=0}^{7} A_1(p,q)\left[\sum_{i=0}^{7}\sum_{j=0}^{7} \Psi_p^8(i)\cdot\Psi_q^8(j)\cdot\Psi_k^8(i)\cdot\Psi_l^{16}(j)\right] + \sum_{p=0}^{7}\sum_{q=0}^{7} A_2(p,q)\left[\sum_{i=0}^{7}\sum_{j=0}^{7} \Psi_p^8(i)\cdot\Psi_q^8(j)\cdot\Psi_k^8(i)\cdot\Psi_l^{16}(j+8)\right]. \quad (5)$$

In this expression, $\acute{A}$ is valid for k∈[0,7] and l∈[0,15]. Since we are interested in a horizontally decimated block, however, we only consider the values k, l∈[0,7]. To denote this horizontally decimated block, and the final 8×8 DCT block, let $\tilde{A}=\acute{A}$ for k, l∈[0,7], as seen in FIG. 6A.

The filters denoted by the bracketed expressions in equation (5) are vertically invariant. That is, the same filters are used to achieve output index $(k_1,l_1)$ and $(k_2,l_2)$. As might be expected, these filters are solely dependent on the input values of the same row. In other words, a 16-tap filter can be used for each output value.

The filtering process described above may also be expressed in matrix form as:

$$\tilde{A} = X_{horizontal}\begin{bmatrix} A_1 \\ A_2 \end{bmatrix} \quad (6)$$

Figure 7:
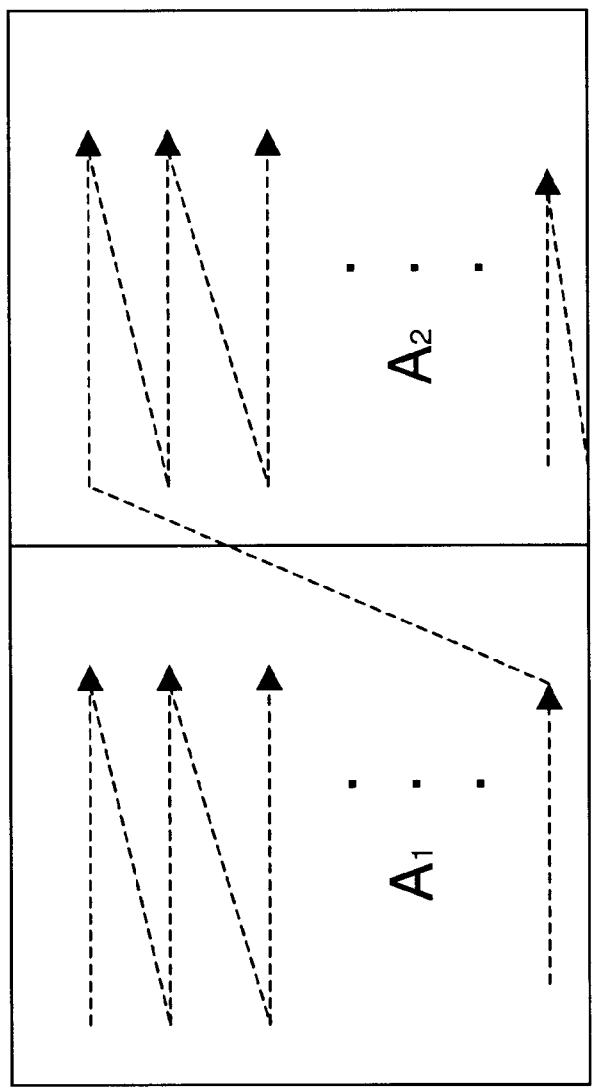
FIG. 7 illustrates a raster scan pattern for expressing a 2D block as a vector.

In this equation (6), $A_1$ and $A_2$ denote the 2D DCT blocks $A_1$ and $A_2$ represented as vectors by means of a raster scan illustrated in FIG. 7, and $X_{horizontal}$ is a 64×128 matrix containing the filter taps used to filter the 2D DCT blocks, and can be expressed as:

$$X_{horizontal}=[X_{h1}X_{h2}]. \quad (7)$$

where $X_{h1}$ and $X_{h2}$ represent the filter matrices applied to $A_1$ and $A_2$ respectively. Further, these filters can be expressed as:

$$X_{h1}(8k+l, 8p+q) = \sum_{i=0}^{7}\sum_{j=0}^{7} \Psi_p^8(i)\cdot\Psi_q^8(j)\cdot\Psi_k^8(i)\cdot\Psi_l^{16}(j), \quad (8)$$

$$X_{h2}(8k+l, 8p+q) = \sum_{i=0}^{7}\sum_{j=0}^{7} \Psi_p^8(i)\cdot\Psi_q^8(j)\cdot\Psi_k^8(i)\cdot\Psi_l^{16}(j+8).$$

where k, l, p, q∈[0,7].

Now that the "frequency synthesis" filters for performing horizontal decimation in the DCT domain have been expressed; the spatial equivalents to these frequency domain filters can be easily derived.

Initially, the general equation to obtain a M×N block of DCT coefficients C(k,l) from a spatial input block c(i,j) is expressed as:

$$C(k, l) = \sum_{i=0}^{M-1}\sum_{j=0}^{N-1} c(i, j)\Psi_k^M(i)\Psi_l^N(j); \qquad (9)$$

$$0 \leq k \leq M - 1, 0 \leq l \leq N - 1$$

and its inverse as:

$$C(i, j) = \sum_{i=0}^{M-1}\sum_{j=0}^{N-1} c(k, l)\Psi_k^M(i)\Psi_l^N(j); \qquad (10)$$

$$0 \leq k \leq M - 1, 0 \leq l \leq N - 1.$$

Our objective for converting from the DCT domain to the spatial domain is to express the following DCT domain relationship:

$$H(k, l) = \sum_{p=0}^{M-1}\sum_{q=0}^{N-1} [X_{k,l}(p, q) \cdot F(p, q)] \qquad (11)$$

$$h(i, j) = \sum_{s=0}^{M-1}\sum_{t=0}^{N-1} [x_{i,j}(s, t) \cdot f(s, t)] \qquad (12)$$

where H and h are the DCT and spatial horizontal down-conversion outputs respectively, F and f are the DCT and spatial inputs to the horizontal down-conversion respectively, and X and x are the DCT and spatial filters used to perform horizontal down-conversion respectively.

Using the general inverse DCT equation (10) and the definition of H(k,l) expressed in equation (11) to represent h(i,j), we see that:

$$h(i, j) = \sum_{k=0}^{M-1}\sum_{l=0}^{N-1}\left[\sum_{p=0}^{M-1}\sum_{q=0}^{N-1} X_{k,l}(p, q) \cdot F(p, q)\right]\Psi_k^M(i)\Psi_l^N(j) \qquad (13)$$

which can also be expressed as, $$h(i, j) = \sum_{p=0}^{M-1}\sum_{q=0}^{N-1} F(p, q)\left[\sum_{k=0}^{M-1}\sum_{l=0}^{N-1} X_{k,l}(p, q) \cdot \Psi_k^M(i)\Psi_l^N(j)\right]. \qquad (14)$$

Using the general DCT definition of equation (9) to represent F(p,q), equation (14) results in:

$$h(i, j) = \sum_{p=0}^{M-1}\sum_{q=0}^{N-1}\left[\sum_{s=0}^{M-1}\sum_{t=0}^{N-1} f(s, t) \cdot \Psi_p^M(s)\Psi_q^N(t)\right]. \qquad (15)$$

$$\sum_{k=0}^{M-1}\sum_{l=0}^{N-1} [X_{k,l}(p, q) \cdot \Psi_k^M(i)\Psi_l^N(j)].$$

The spatial domain filter generally expressed in equation (12) can be represented as $$x_{i,j}(s, t) = \sum_{k=0}^{M-1}\sum_{l=0}^{N-1}\left[\Psi_k^M(i)\Psi_l^N(j)\sum_{p=0}^{M-1}\sum_{q=0}^{N-1}(X_{k,l}(p, q) \cdot \Psi_p^M(s)\Psi_q^N(t))\right]. \qquad (16)$$

Finally, horizontal down-conversion filters $x_{h1}$ and $x_{h2}$ can be represented as $$x_{h1}(s, t) = \sum_{k=0}^{7}\sum_{l=0}^{7}\left\{\Psi_k^8(i)\Psi_l^8(j)\right. \qquad (17)$$

$$\left.\left(\sum_{p=0}^{7}\sum_{q=0}^{7}\left[\sum_{i=0}^{7}\sum_{j=0}^{7}\Psi_p^8(i) \cdot \Psi_q^8(j) \cdot \Psi_k^8(i) \cdot \Psi_l^{16}(j)\right] \cdot \Psi_p^8(s)\Psi_l^8(t)\right)\right\}$$

and $$x_{h2}(s, t) =$$

$$\sum_{k=0}^{7}\sum_{l=0}^{7}\left\{\Psi_k^8(i)\Psi_l^8(j)\left(\sum_{p=0}^{7}\sum_{q=0}^{7}\left[\sum_{i=0}^{7}\sum_{j=0}^{7}\Psi_p^8(i) \cdot \Psi_q^8(j) \cdot \Psi_k^8(i) \cdot\right.\right.\right.$$

$$\left.\left.\left.\Psi_l^{16}(j+9)\right] \cdot \Psi_p^8(s)\Psi_q^8(t)\right)\right\}$$

Equation (17) thus represents the spatial domain filters which may be used by the first and second horizontal down-converters 120 and 122 of the FIG. 1 to perform horizontal decimation on input spatial data blocks.

Vertical Down Conversion

For vertical decimation, "frequency synthesis" is considered in the vertical direction only, and is described with reference to FIGS. 6B and 6C. Frame-based vertical down-conversion will be described with reference to FIG. 6B, while field-based vertical down-conversion will be described with reference to FIG. 6C. These vertical down-conversion schemes may be used by the first and second vertical down-converters 130 and 132 of the decoder illustrated in FIG. 1.

Frame-based vertical down-conversion is substantially similar to horizontal down-conversion, except that the filter taps are applied to vertically adjacent blocks rather than horizontally adjacent blocks. These filters are horizontally invariant, and thus the same filters are used to achieve outputs $(k_1,l_1)$ and $(k_2,l_2)$. Rather than the output depending solely on values of the same row, as was the case for horizontal down-conversion, an output value for frame-based vertical down-conversion depends solely on inputs of the same column.

Assuming, as shown in FIG. 6B, that $A_1$ and $A_2$ now represent vertically adjacent 8×8 DCT blocks, and Ã represents a temporary 16×8 DCT block, it can be verified that, $$\tilde{A}(k, l) = \sum_{p=0}^{7}\sum_{q=0}^{7} A_1(p, q)\left[\sum_{i=0}^{7}\sum_{j=0}^{7}\Psi_p^8(i) \cdot \Psi_q^8(j) \cdot \Psi_k^8(i) \cdot \Psi_l^{16}(j)\right] + \qquad (18)$$

$$\sum_{p=0}^{7}\sum_{q=0}^{7} A_2(p, q)\left[\sum_{i=0}^{7}\sum_{j=0}^{7}\Psi_p^8(i) \cdot \Psi_q^8(j) \cdot \Psi_k^{16}(i+8) \cdot \Psi_l^8(j)\right]$$

Since we are only concerned with a vertically decimated block, we only consider $k,l \in [0,7]$ to arrive at Ã.

Again, this filtering process may be expressed in matrix form, this time as:

$$\tilde{A} = X_{vert-fr} \begin{bmatrix} A_1 \\ A_2 \end{bmatrix} \quad (19)$$

where $X_{vert-fr}$ is a 64×128 matrix containing the filter taps used to filter the 2D DCT blocks, and can be represented as:

$$X_{vert-fr}[X_{vfr1} X_{vfr2}] \quad (20)$$

where $X_{vfr1}$ and $X_{vfr2}$ represent the filter matrices applied to $A_1$ and $A_2$ respectively, and can be represented as:

$$X_{vfr1}(8k+l, 8p+q) = \sum_{i=0}^{7}\sum_{j=0}^{7} \Psi_p^8(i) \cdot \Psi_q^8(j) \cdot \Psi_k^{16}(i) \cdot \Psi_l^8(j), \quad (21)$$

$$X_{vfr2}(8k+l, 8p+q) = \sum_{i=0}^{7}\sum_{j=0}^{7} \Psi_p^8(i) \cdot \Psi_q^8(j) \cdot \Psi_k^{16}(i+8) \cdot \Psi_l^8(j).$$

where, k, l, p, q∈[0,7].

As was discussed in detail for the spatial horizontal down-conversion filters, spatial equivalents of these DCT domain filters can easily be generated in view of equations (18)–(21) using the relationships expressed in equations (9)–(16) to arrive at:

$$x_{vfr1}(s,t) = \sum_{k=0}^{7}\sum_{l=0}^{7}\left\{\Psi_k^8(i)\Psi_l^8(j)\right. \quad (22)$$

$$\left.\left(\sum_{p=0}^{7}\sum_{q=0}^{7}\left[\sum_{i=0}^{7}\sum_{j=0}^{7}\Psi_p^8(i)\cdot\Psi_q^8(j)\cdot\Psi_k^{16}(i)\cdot\Psi_l^8(j)\right]\cdot\Psi_p^8(s)\Psi_q^8(t)\right)\right.$$

$$x_{vfr2}(s,t) =$$

$$\sum_{k=0}^{7}\sum_{l=0}^{7}\left\{\Psi_k^8(i)\Psi_l^8(j)\left(\sum_{p=0}^{7}\sum_{q=0}^{7}\left[\sum_{i=0}^{7}\sum_{j=0}^{7}\Psi_p^8(i)\cdot\Psi_q^8(j)\cdot\Psi_k^{16}(i+8)\cdot\right.\right.\right.$$

$$\left.\left.\left.\Psi_l^8(j)\right]\cdot\Psi_p^8(s)\Psi_q^8(t)\right)\right.$$

As mentioned above, in horizontal down-conversion, the DCT format of a macroblock (i.e., field or frame based) does not affect horizontal decimation because the output values depend only on the input values of the current row. In vertical down-conversion, however, the DCT format must be considered in generating the filter tap matrix used to filter the 2D blocks. For field based down-conversion, as illustrated in FIG. 6C, $A_1$ and $A_2$ represent vertically adjacent 8×8 DCT blocks, with $A_1$ representing the even field, and $A_2$ representing the odd field. As illustrated in FIG. 6C, a single 8×8 block, $\tilde{A}$, is obtained by taking a 4×8 block from Bach 8×8 DCT block $A_1$ and $A_2$. Expressed another way, $$\tilde{A}_1(k,l)=A_1(k,l) 0 \leq k \leq 3, 0 \leq l \leq 7,$$

$$\tilde{A}_2(k,l)=A_2(k,l) 0 \leq k \leq 3, 0 \leq l \leq 7. \quad (23)$$

where $\tilde{A}_1(k,l)$ represents a 4×8 block component of $\tilde{A}$ taken from the 8×8 block $A_1$, and $\tilde{A}_2(k,l)$ represents a 4×8 block component taken from the 8×8 block $A_2$.

As was the case for frame-based vertical down-conversion, the field-based filter are vertically invariant. Since half the amount of information is being input, however, an 8 tap filter can be used instead of a 16 tap filter.

This filtering process is expressed in matrix form as:

$$\tilde{A} = X_{vert-fld}\begin{bmatrix} A_1 \\ A_2 \end{bmatrix} \quad (24)$$

where $X_{vert-fld}$ is a 64×128 matrix containing the filter taps used to filter the 2D DCT block, and is represented as:

$$X_{vert-fld} = \begin{bmatrix} X_{vfld1} & 0 \\ 0 & X_{vfld1} \end{bmatrix} \quad (25)$$

where $X_{vfld1}$ is a 32×64 matrix given by, $$X_{vfld1}(8k+l, 8p+q) = \begin{cases} 1; k=p AND l=q, \\ 0; \text{otherwise.} \end{cases} \quad (26)$$

where, k∈[0,3] and l,p,q∈[0,7].

These filters may be expressed in the spatial domain as:

$$x_{vfld1}(s,t) = \sum_{k=0}^{3}\sum_{l=0}^{7}\left\{\Psi_k^4(i)\Psi_l^8(j)\left(\sum_{p=0}^{3}\sum_{q=0}^{7}[\delta(k,p)\cdot\right.\right. \quad (27)$$

$$\left.\left.\{([\delta(1,q)]\Psi_p^4(s)\Psi_q^8(t))\right\}\right.$$

where δ(k,p) is a Kronecker delta function and is defined as $$\delta(k,p) = \begin{cases} 1; k=p \\ 0; k \neq p. \end{cases}$$

Motion Compensation

Having described separable horizontal and vertical down conversion schemes, motion compensation according to the present invention is next described.

Figures 8A, 8B:
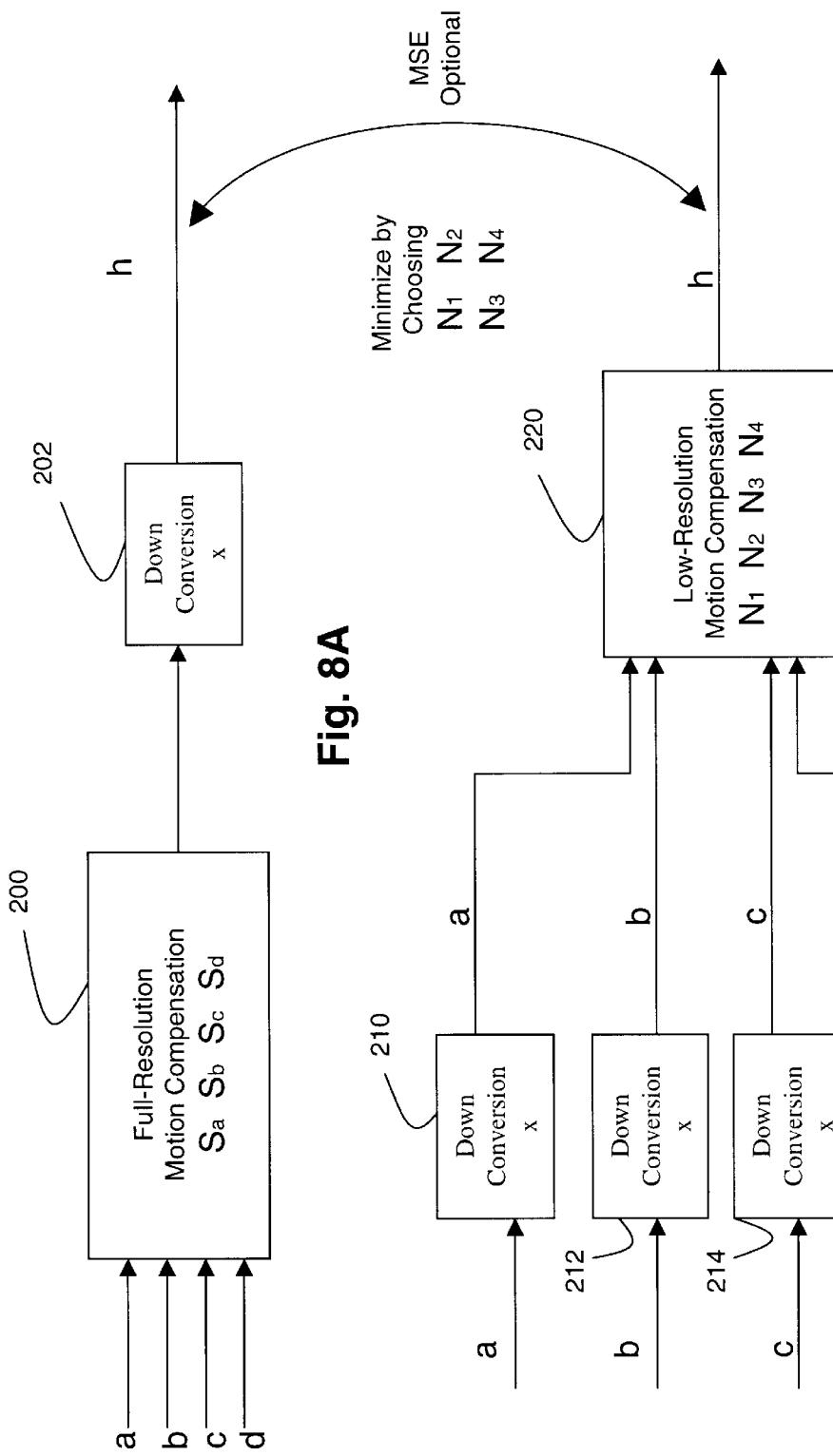
FIG. 8A illustrates an apparatus according to the present invention for obtaining reference macroblocks.
FIG. 8B illustrates an apparatus according to the present invention for performing motion compensation on down-converted macroblocks.
Figure 9:
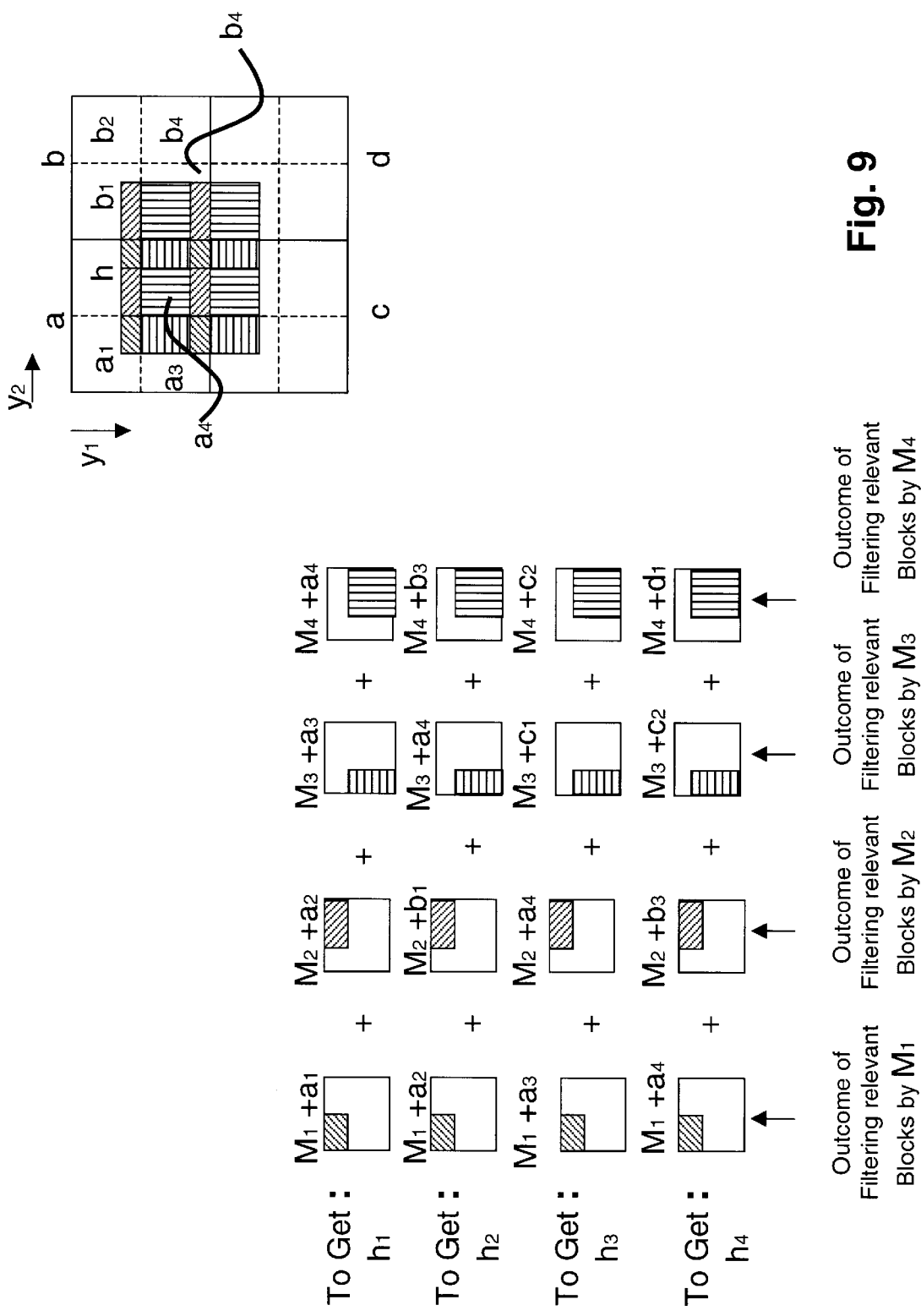
FIG. 9 illustrates the motion compensation process performed on full resolution macroblocks.

The following discussion initially sets forth a system for deriving a set of optimized low resolution motion filters with reference to FIGS. 8A, 8B, 9. Next, a general device for implementing these derived low resolution motion compensation filters is described with reference to FIG. 10.

Figure 11:
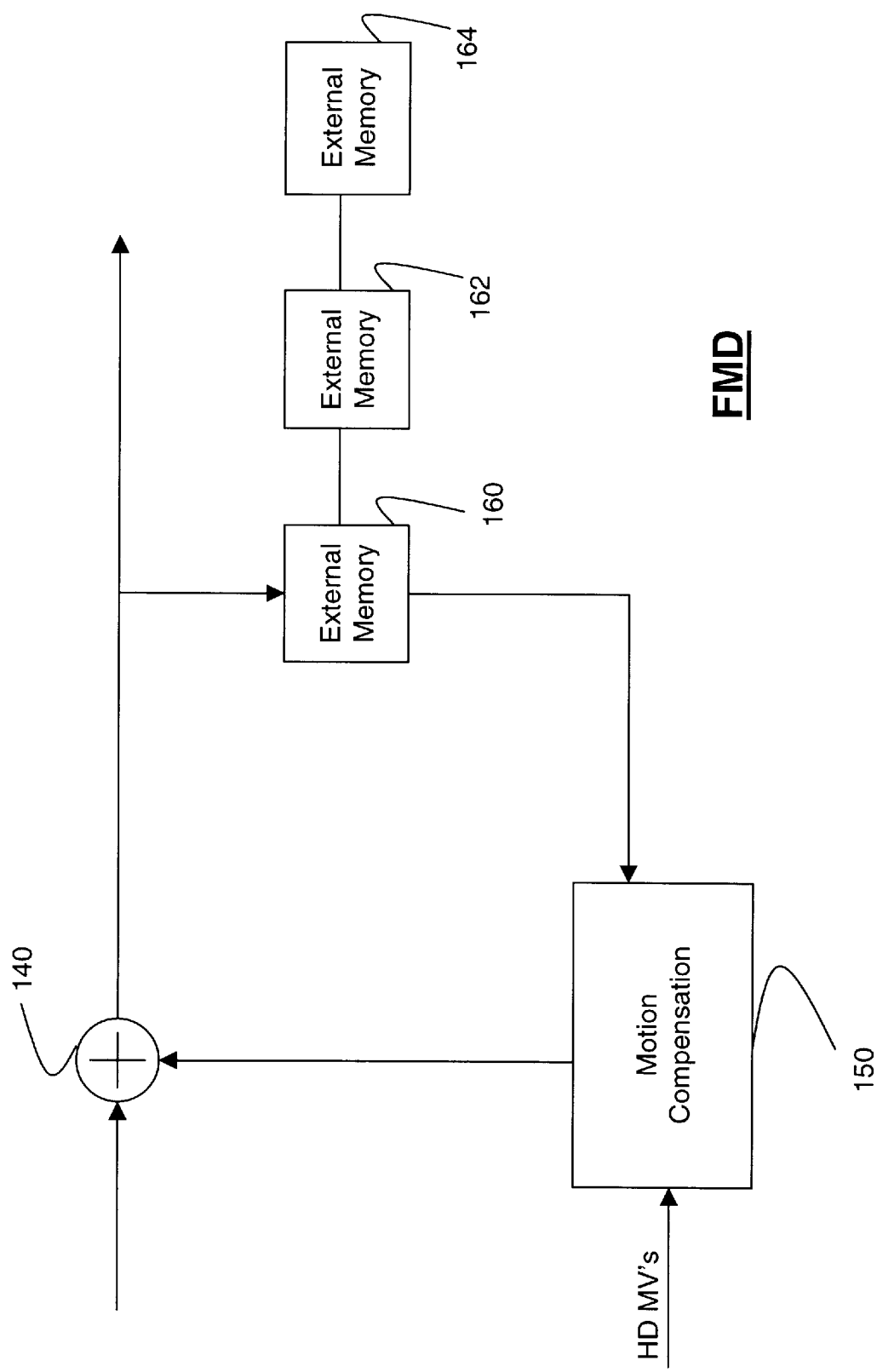
FIG. 11 illustrates the decoder elements which perform motion compensation in the full memory decoder mode.
Figure 13:
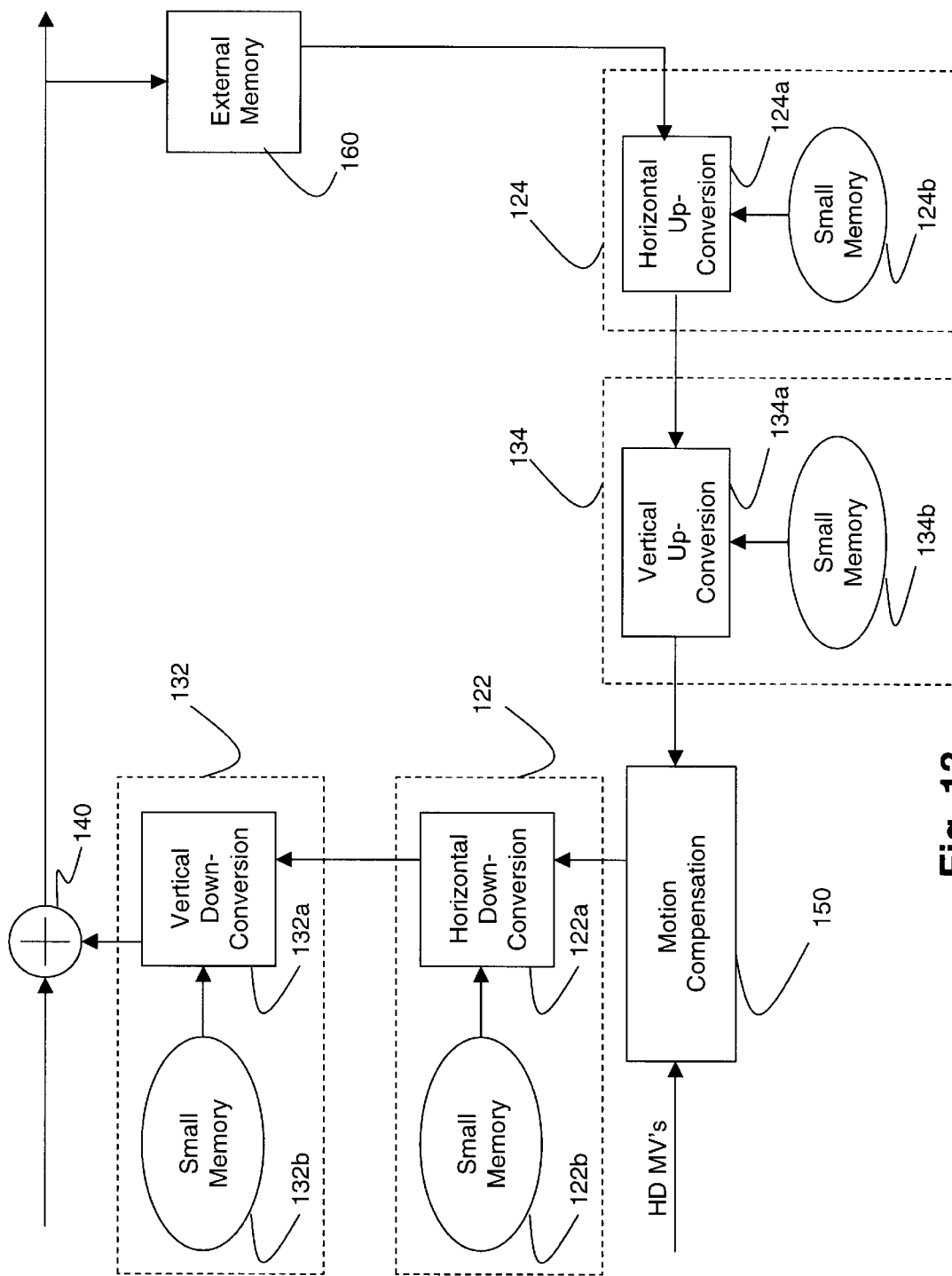
FIG. 13 illustrates the decoder elements which perform motion compensation in the quarter memory decoder mode.

Finally, a specific implementation of optimized motion compensation for the scaleable decoder illustrated in FIG. 1 is discussed with reference to FIGS. 11–13. FIGS. 11–13 illustrate motion compensation in a scaleable decoder, such as that illustrated in FIG. 1, which includes a motion compensator 150 using a conventional motion compensation scheme such as the MPEG2 standard.

1. Deriving Optimal Low Resolution Motion Compensation Filters

As the following discussion will demonstrate, a set of optimal low resolution motion compensation filters can be derived for any given down-conversion filter x. Such a set of filters is deemed optimal in the sense that it minimizes the mean-square-error (MSE) between a reference block, obtained in a manner discussed below with reference to FIG. 8A, and a block obtained through actual low-resolution motion compensation. The following derivation assumes that a known spatial domain filter, x, is applied to incoming macroblocks to achieve down-conversion.

FIG. 8A illustrates an apparatus for generating a low-resolution reference block. The process performed by the apparatus of FIG. 8A corresponds to a conventional motion compensation process, such as MPEG2, represented in matrix form where full resolution anchor pictures are used to reconstruct image data which has been inter-coded.

A full-resolution motion compensator 200 receives incoming 16×16 macroblocks a, b, c, and d, each including four 8×8 blocks, and applies full resolution motion compensation filters $S_a^{(r)}, S_b^{(r)}, S_c^{(r)},$ and $S_d^{(r)}$ to macroblocks a, b, c, and d respectively to generate macroblock h. This process may be expressed in matrix form as:

$$\underline{h} = S_a \begin{bmatrix} a_1 \\ a_2 \\ a_3 \\ a_4 \end{bmatrix} + S_b \begin{bmatrix} b_1 \\ b_2 \\ b_3 \\ b_4 \end{bmatrix} + S_c \begin{bmatrix} c_1 \\ c_2 \\ c_3 \\ c_4 \end{bmatrix} + S_d \begin{bmatrix} d_1 \\ d_2 \\ d_3 \\ d_4 \end{bmatrix} \quad (28)$$

where, as seen in FIG. 9, a 16×16 macroblock a includes the 8×8 blocks $a_1, a_2, a_3,$ and $a_4$, a 16×16 macroblock b includes the 8×8 blocks $b_1, b_2, b_3,$ and $b_4$, a 16×16 macroblock c includes the 8×8 blocks $c_1, c_2, c_3,$ and $c_4$, and a 16×16 macroblock d includes the 8×8 blocks $d_1, d_2, d_3,$ and $d_4$.

In FIG. 9, macroblocks a, b, c, and d, and a local reference (y1, y2) are illustrated. The local reference (y1, y2) is computed from a motion vector (dx, dy) in accordance with the following equation:

$$y_1 = dy - 16 \cdot \left[ \text{Integer}\left(\frac{dy}{16}\right) - \text{Temp}_1 \right] \quad (29)$$

$$y_2 = dx - 16 \cdot \left[ \text{Integer}\left(\frac{dx}{16}\right) - \text{Temp}_2 \right]$$

Where $\text{Temp}_1 = 1$ when dy<0 AND dy Mod 16=0; and $\text{Temp}_1 = 0$ otherwise;

$\text{Temp}_2 = 1$ when dx<0 AND dx Mod 16=0; and $\text{Temp}_2 = 0$ otherwise.

The local reference (y1, y2) points to a location in macroblock a which signifies the anchor macroblock which provides the greatest correlation with an encoded macroblock.

For the example illustrated in FIG. 9, the local reference (y1, y2) points to a location in block a1, and therefore r=1. When the local reference (y1, y2) points to a location in block a2, then r=2, when the local reference (y1, y2) points to a location in block a3, then r=3, and when the local reference (y1, y2) points to a location in block a4, then r=4. As shown below, there are four different representations for filters $S_a^{(r)}, S_b^{(r)}, S_c^{(r)},$ and $S_d^{(r)}$ respectively, depending on whether r=1, 2, 3, or 4.

The full-resolution motion compensation filters produce macroblock h, which represents the full resolution motion compensation result, from components of macroblocks a, b, c, and d. These filters for the local reference (y1, y2) of FIG. 9, where r=1, can be represented as:

$$S_a^{(1)} = \begin{bmatrix} M_1 & M_2 & M_3 & M_4 \\ 0 & M_1 & 0 & M_3 \\ 0 & 0 & M_1 & M_2 \\ 0 & 0 & 0 & M_1 \end{bmatrix}, S_b^{(1)} = \begin{bmatrix} 0 & 0 & 0 & 0 \\ M_2 & 0 & M_4 & 0 \\ 0 & 0 & 0 & 0 \\ 0 & 0 & M_2 & 0 \end{bmatrix}, \quad (30)$$

$$S_c^{(1)} = \begin{bmatrix} 0 & 0 & 0 & 0 \\ 0 & 0 & 0 & 0 \\ M_3 & M_4 & 0 & 0 \\ 0 & M_3 & 0 & 0 \end{bmatrix}, S_d^{(1)} = \begin{bmatrix} 0 & 0 & 0 & 0 \\ 0 & 0 & 0 & 0 \\ 0 & 0 & 0 & 0 \\ M_4 & 0 & 0 & 0 \end{bmatrix}.$$

Similarly, for r=2, 3, and 4, these filters are respectively represented as:

$$S_a^{(2)} = \begin{bmatrix} 0 & M_1 & 0 & M_3 \\ 0 & 0 & 0 & 0 \\ 0 & 0 & 0 & M_1 \\ 0 & 0 & 0 & 0 \end{bmatrix}, S_b^{(2)} = \begin{bmatrix} M_2 & 0 & M_4 & 0 \\ M_1 & M_2 & M_3 & M_4 \\ 0 & 0 & M_2 & 0 \\ 0 & 0 & M_1 & M_2 \end{bmatrix}, \quad (31)$$

$$S_c^{(2)} = \begin{bmatrix} 0 & 0 & 0 & 0 \\ 0 & 0 & 0 & 0 \\ 0 & M_3 & 0 & 0 \\ 0 & 0 & 0 & 0 \end{bmatrix}, S_d^{(2)} = \begin{bmatrix} 0 & 0 & 0 & 0 \\ 0 & 0 & 0 & 0 \\ M_4 & 0 & 0 & 0 \\ M_3 & M_4 & 0 & 0 \end{bmatrix}.$$

$$S_a^{(3)} = \begin{bmatrix} 0 & 0 & M_1 & M_2 \\ 0 & 0 & 0 & M_1 \\ 0 & 0 & 0 & 0 \\ 0 & 0 & 0 & 0 \end{bmatrix}, S_b^{(3)} = \begin{bmatrix} 0 & 0 & 0 & 0 \\ 0 & 0 & M_2 & 0 \\ 0 & 0 & 0 & 0 \\ 0 & 0 & 0 & 0 \end{bmatrix}, \quad (32)$$

$$S_c^{(3)} = \begin{bmatrix} M_3 & M_4 & 0 & 0 \\ 0 & M_3 & 0 & 0 \\ M_1 & M_2 & M_3 & M_4 \\ 0 & M_1 & 0 & M_3 \end{bmatrix}, S_d^{(3)} = \begin{bmatrix} M_4 & 0 & 0 & 0 \\ M_3 & M_4 & 0 & 0 \\ M_2 & 0 & M_4 & 0 \\ M_1 & M_2 & M_3 & M_4 \end{bmatrix}.$$

$$S_a^{(4)} = \begin{bmatrix} 0 & 0 & 0 & M_1 \\ 0 & 0 & 0 & 0 \\ 0 & 0 & 0 & 0 \\ 0 & 0 & 0 & 0 \end{bmatrix}, S_b^{(4)} = \begin{bmatrix} 0 & 0 & M_2 & 0 \\ 0 & 0 & M_1 & M_2 \\ 0 & 0 & 0 & 0 \\ 0 & 0 & 0 & 0 \end{bmatrix}, \quad (33)$$

$$S_c^{(4)} = \begin{bmatrix} 0 & M_3 & 0 & 0 \\ 0 & 0 & 0 & 0 \\ 0 & M_2 & 0 & M_3 \\ 0 & 0 & 0 & 0 \end{bmatrix}, S_d^{(4)} = \begin{bmatrix} M_4 & 0 & 0 & 0 \\ M_3 & M_4 & 0 & 0 \\ M_2 & 0 & M_4 & 0 \\ M_1 & M_2 & M_3 & M_4 \end{bmatrix}.$$

$M_1$, $M_2$, $M_3$ and M4 represent masks applied to the corresponding 8×8 blocks of a, b, c, d. As one of ordinary skill in the art will recognize, the $M_1$, $M_2$, $M_3$ and $M_4$ masks extract the desired components from corresonding blocks of a, b, c, and d, and will vary depending on a number of factors; including the amount of overlap with macroblock a indicated by the local reference (y1, y2), and the type of prediction (e.g., frame or field based, horizontal half-pel accuracy, diagonal half-pel accuracy, etc.). Accordingly, it will be routine for one having ordinary skill in the art to generate masks $M_1$, $M_2$, $M_3$ and $M_4$.

As seen from the example of FIG. 9, each 8×8 block $h_1$, $h_2$, $h_3$, $h_4$ of macroblock h has a component which is generated by applying masks $M_1$, $M_2$, $M_3$, and $M_4$ to an input 8×8 block.

For the specific example illustrated in FIG. 9, $h_1$ includes a first component generated by applying mask $M_1$ to block a, a second component generated by applying mask $M_2$ to block $a_2$, a third component generated by applying mask $M_3$ to block $a_3$, and a fourth component generated by applying mask $M_4$ to block $a_4$.

Similarly, macroblock $h_2$ includes a first component generated by applying mask $M_1$ to block $a_2$, a second component generated by applying mask $M_2$ to $b_1$, a third component generated by applying mask $M_3$ to block $a_4$, and a fourth component generated by applying mask $M_4$ to block $b_3$. Macroblock $h_3$ includes a first component generated by applying mask $M_1$ to 8×8 block $a_3$, a second block obtained by applying mask $M_2$ to block $a_4$, a third component generated by applying mask $M_3$ to block $c_1$, and a fourth component generated by applying mask $M_4$ to block $c_2$. Finally, $h_4$ includes a first component generated by applying mask $M_1$ to block $a_4$, a second component generated by applying mask $M_2$ to block b3, a third component generated by applying mask $M_3$ to block $c_2$, and a fourth component generated by applying mask $M_4$ to block $d_1$.

In the example o FIG. 9, macroblock h is predominantly generated from macroblock a due to the large overlap with block $a_1$. Thus, the filter represented by $S_a^{(1)}$ is relatively dense compared to that represented by $S_d^{(1)}$.

After the full-resolution motion compensator 200 applies filters $S_a^{(r)}$, $S_b^{(r)}$, $S_c^{(r)}$, and $S_d^{(r)}$ to incoming full-resolution macroblocks a, b, c, and d respectively, a down-conversion unit 202 receives the resulting macroblock h. The down-conversion unit 202 down-converts full-resolution macroblock h using a given down-conversion filter, x, to obtain reference block $\tilde{h}$. This process is expressed as:

$$\tilde{h} = xh = x[S_a \ S_b \ S_c \ S_d]\begin{bmatrix}a\\b\\c\\d\end{bmatrix} \quad (34)$$

This reference block $\tilde{h}$ represents the ideal down-converted result of full-resolution motion compensation for a given down-conversion filter x.

FIG. 8B illustrates a device which initially down-converts incoming macroblocks a, b, c, and d using a given down-conversion filter x, and subsequently performs low-resolution motion-compensation. As compared to the device for obtaining a reference block illustrated in FIG. 8A, the apparatus of FIG. 8B uses low resolution anchor pictures for motion compensation. Specifically, as illustrated in FIG. 8B, a first down-conversion unit 210 receives incoming macroblock a, a second down-conversion unit 212 receives macroblock b, a third down-conversion unit 214 receives macroblock c, and a fourth down-conversion unit 216 receives macroblock d.

The first down-conversion unit 210, the second down-conversion unit 212, the third down-conversion unit 214, and the fourth down-conversion unit 216 respectively down-convert macroblocks a, b, c, and d with the down-conversion filter x to yield down-converted macroblocks $\tilde{a}$, $\tilde{b}$, $\tilde{c}$, and $\tilde{d}$.

A low resolution motion compensation unit 220 receives the output of each of the first down-conversion unit 210, the second down-conversion unit 212, the third down-conversion unit 214, and the fourth down-conversion unit 216, and performs low-resolution motion compensation to generate $\hat{h}$. The motion compensation performed by the low resolution motion compensation unit 220 can be expressed as:

$$\hat{h} = [N_1 \ N_2 \ N_3 \ N_4]\begin{bmatrix}\tilde{a}\\\tilde{b}\\\tilde{c}\\\tilde{d}\end{bmatrix} = [N_1 \ N_2 \ N_3 \ N_4]\begin{bmatrix}xa\\xb\\xc\\xd\end{bmatrix} \quad (35)$$

where $N_1$, $l\in[1,4]$ are the filters which perform low-resolution motion compensation, and $\hat{h}$ is the low-resolution prediction result generated by low-resolution motion compensation unit 220. These filters are solved for by differentiating the following objective function, $$J\{N_1\} = \|\tilde{h} - \hat{h}\|^2 \quad (36)$$

with respect to each filter and setting each result equal to zero. That is:

$$\frac{\partial J_i\{N_1 N_2 N_3 N_4\}}{\partial N_1} = 0,$$

$$\frac{\partial J_i\{N_1 N_2 N_3 N_4\}}{\partial N_2} = 0,$$

$$\frac{\partial J_i\{N_1 N_2 N_3 N_4\}}{\partial N_3} = 0,$$

$$\frac{\partial J_i\{N_1 N_2 N_3 N_4\}}{\partial N_4} = 0. \quad (37)$$

It can be verified that the matrices which satisfy the above equation are given by:

$$N_1^{(r)} = xS_a^{(r)}x^+; \ N_2^{(r)} = xS_b^{(r)}x^+ \quad (38)$$

$$N_3^{(r)} = xS_c^{(r)}x^+; \ N_4^{(r)} = S_d^{(r)}x^+$$

where $$x^+ = x^\tau(xx^\tau)^{-1} \quad (39)$$

and where $x^+$ is the Moore-Penrose Inverse for an m×n matrix with $m \leq n$ and $x^\tau$ is the transposition of matrix x.

In the solution of equation (31), the superscript r is added to filters $N_1$ to signify their dependence on the full-resolution motion compensation filters $S_a^{(r)}$, $S_b^{(r)}$, $S_c^{(r)}$, and $S_d^{(r)}$. By using these filters to perform the low-resolution motion compensation, the mean-squared-error between reference block $\tilde{h}$, output by the apparatus of FIG. 8A, and $\hat{h}$ output by the apparatus of FIG. 8B is minimized, and thus these filters represent the optimal least squares solution. It is reiterated that equation (31) represents a generalized set of low-resolution motion compensation filters which are applicable to any down-conversion filter x which operates on a single macroblock.

2. General Implementation of Low Resolution Motion Compensation Filters

Figure 10:
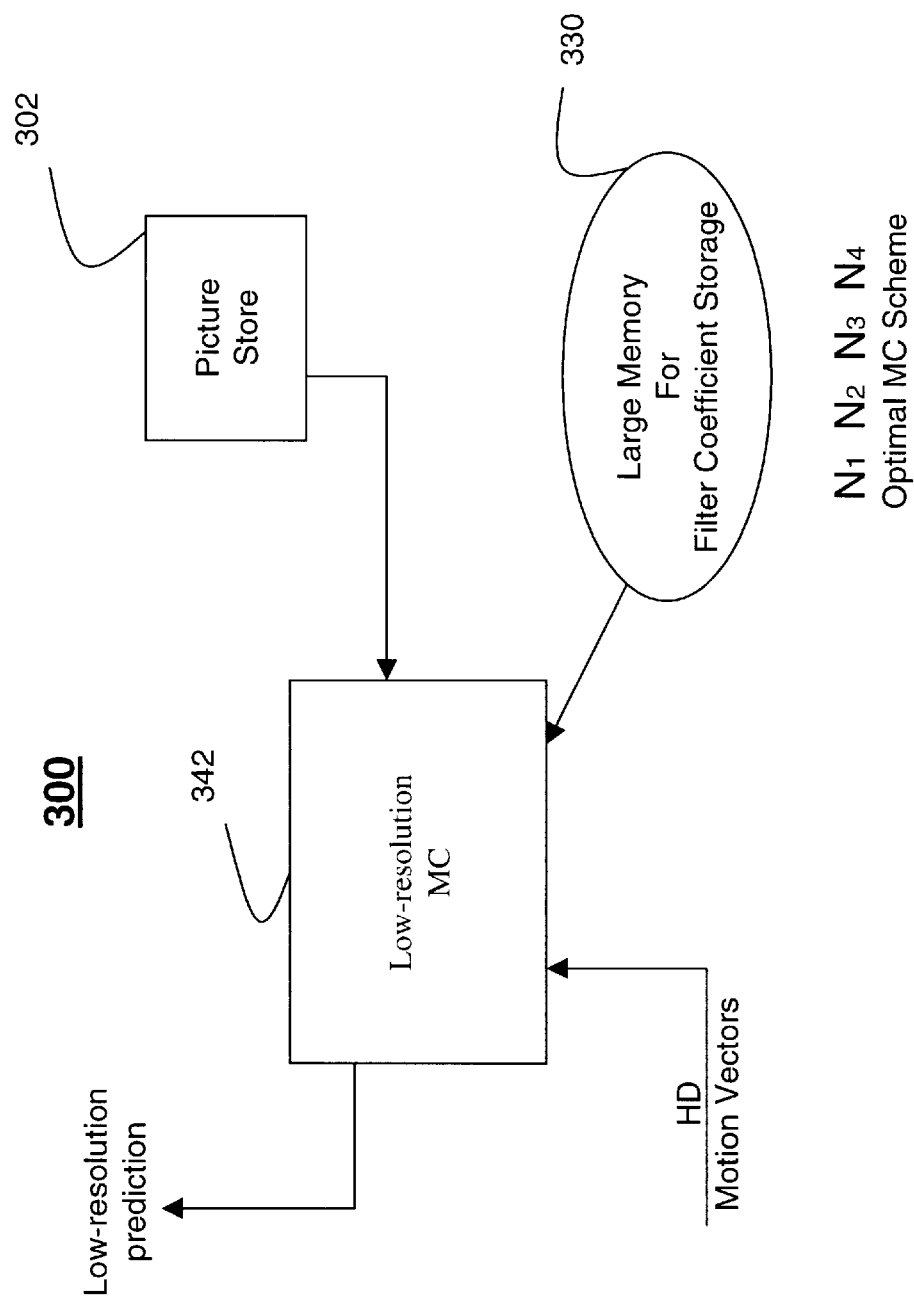
FIG. 10 illustrates an optimized motion compensation scheme according to the present invention.

Having derived an optimized set of low-resolution motion compensation filters $N_1$ for a given down-conversion filter x, these filters may be implemented in a decoding operation in a manner illustrated in FIG. 10. The low resolution motion compensation apparatus 300 includes a picture store 302 which stores low resolution anchor pictures, a low resolution motion compensator 342, and a filter coefficient memory 330 which stores the possible filter coefficients for filters $N_1$.

The low-resolution motion compensator 342 receives low resolution anchor pictures from the picture store 302 and performs motion compensated prediction by applying the optimized set of motion compensation filters $N_1$ to low-resolution macroblocks a, b, c, and d.

While the low-resolution motion compensation filters $N_1^{(r)}$, $l\epsilon[1,4]$ determined in accordance with equation (31) are optimal, actual implementation using these filters requires a large memory for filter coefficient storage because of the numerous possible values for $M_1$, $M_2$, $M_3$ and $M_4$ discussed above.

Therefore, a preferred alternative implementation is discussed below with reference to FIGS. 12 and 13, which respectively correspond to the HMD and QMD operating modes for the scaleable decoder of FIG. 1.

2. Motion Compensation for the Scaleable Decoder a. FMD Mode-Motion Compensation FIG. 11 illustrates the decoder elements necessary for motion compensation when the scaleable decoder of FIG. 1 operates in FMD mode. As discussed in detail above, in FMD mode, the first external memory 160, the second external memory 162, and the third external memory 164 store full resolution anchor pictures. Since the decoder operating in FMD mode has sufficient memory to store full resolution anchor pictures, motion compensation is relatively straightforward. The anchor pictures retrieved from the first external memory 160, the second external memory 162, and the third external memory 164 are directly output to the motion compensator 150 via the third switch 174 (not shown).

The motion compensator 150 performs motion compensated prediction with the full resolution macroblocks input therein using a conventional motion compensation scheme such as the MPEG2 standard. The adder 140 directly receives the output of the motion compensator 150 via the fifth switch 178 (not shown) to generate reconstructed full resolution pictures (for B pictures and P pictures).

b. HMD Mode-Motion Compensation

FIG. 12 illustrates the elements for the scaleable decoder of FIG. 1, operating in HMD mode, which generate horizontally decimated motion compensated data. As illustrated in FIG. 12, the decoder in HMD mode includes the first external memory 160 and the second external memory 162 which store anchor pictures which have been horizontally decimated using a horizontal down-conversion filter $x_{horizontal}$. Instead of performing motion compensation directly on these low-resolution anchor pictures stored in the first external memory 160 and the second external memory 162, the anchor pictures retrieved from the first external memory 160 and the second external memory 162 are received by the horizontal up-converter 124 via the third switch 174 (not shown).

Horizontal up-converter 124 upsamples the horizontally decimated anchor pictures retrieved from the first external memory 160 and the second external memory 162 using a horizontal up-conversion filter $x^+_{horizontal}$. This up-conversion filter $x^+_{horizontal}$ corresponds to the Moore-Penrose inverse for a given horizontal down conversion filter $x_{horizontal}$. The horizontal up-converter 124 includes a horizontal up-conversion unit 124a which applies the up-conversion filter $x^+_{horizontal}$ to the retrieved anchor pictures, and a small capacity memory 124b which stores filter coefficients for up-conversion filter $x^+_{horizontal}$.

As discussed in detail above with reference to FIG. 3, the motion compensator 150 receives the output of horizontal up-converter 124 via the fourth switch 176 (not shown), and performs motion compensated prediction using a conventional scheme such as the MPEG2 standard.

The second horizontal down-converter 122 receives the output of motion compensator 150 via the fifth switch 178 (not shown) and performs horizontal down conversion on the received data with down-conversion filter $x_{horizontal}$. The second horizontal down-converter 122 includes a horizontal down-conversion unit 122a which applies horizontal down-conversion filter $x_{horizontal}$ to incoming data, and a small capacity memory 122b which stores coefficients for down-conversion filter $x_{horizontal}$ The implementation illustrated FIG. 12 achieves equivalent results as the embodiment illustrated in FIG. 10, and achieves optimal motion compensation for a given down-conversion filter.

c. QMD Mode-Motion Compensation

FIG. 13 illustrates the elements of the scaleable decoder of FIG. 1, operating in QMD mode, for generating horizontally and vertically decimated motion compensation data. As illustrated in FIG. 13, the decoder in QMD mode includes the first external memory 160 which stores horizontally and vertically decimated anchor pictures. Instead of performing motion compensation on these low-resolution anchor pictures stored in the first external memory 160, the low resolution anchor pictures retrieved from the first external memory 160 are output to the horizontal up-converter 124 via the third switch 174 (not shown).

As discussed above, the horizontal up-converter 124 applies horizontal up-conversion filter $x^+_{horizontal}$ to the retrieved low-resolution anchor pictures.

The vertical up-converter 134 receives the output of the horizontal up-converter 124 via the fourth switch 176 (not shown), and applies a vertical up-conversion filter $x^+_{vertical}$ to the spatial data output from the horizontal up-converter 124. This up-conversion filter $x^+_{vertical}$, corresponds to the Moore-Penrose inverse for a given vertical down conversion filter $x_{vertical}$, The vertical up-converter 134 includes a vertical up-conversion unit 134a which applies vertical up-conversion filter $x^+_{vertical}$ to incoming data, and a small capacity memory 134b which stores filter coefficients for up-conversion filter $x^+_{vertical}$.

As discussed in detail above with reference to FIG. 4, the motion compensator 150 receives the output of vertical up-converter 134, and performs motion compensated prediction using a conventional scheme such as the MPEG2 standard.

The second horizontal down-converter 122 receives the output of motion compensator 150 via the fifth switch 178 (not shown), and performs horizontal down-conversion on the received data using horizontal down-conversion filter $x_{horizontal}$ to generate horizontally decimated motion compensated data.

The second vertical down-converter 132 receives the output of the second horizontal down-converter 122 via the sixth switch 179 (not shown) and vertically decimates the spatial data output by the second horizontal down-converter 122 using vertical down-conversion filter $x_{vertical}$ to generate horizontally and vertically decimated motion compensated data to be added by adder 140 to residual image data (for B pictures and P pictures). The second vertical down-converter 132 includes a vertical down-conversion unit 132a which applies vertical down-conversion filter $x_{vertical}$ to incoming data, and a small capacity memory 132b which stores filter coefficients for filter $x_{vertical}$.

The implementation illustrated FIG. 13 achieves equivalent results as the embodiment illustrated in FIG. 10, and achieves optimal motion compensation for a given down-conversion filter.

The motion compensation implementations illustrated in FIGS. 12–13 are preferred over that illustrated in FIG. 10 because a large memory capacity for storing motion compensation filter coefficients is not required. Furthermore, the computational load associated with down-conversion is reduced because separable horizontal and vertical down-conversion filters are utilized. Still further, a conventional motion compensation scheme, such as the MPEG2 standard, can be used.

The embodiments illustrated in FIGS. 12 and 13, however, do require additional processing units. Specifically, in HMD mode, the horizontally decimated anchor pictures stored in the first external memory 160 and the second external memory 162 must be processed by the horizontal up-converter 124 before motion compensation is performed, and the motion compensation result must be down-converted by the second down-converter 122. In QMD mode, the vertical up-converter 134 and the second vertical down-converter 132 are additionally required.

When memory capacity is not a concern, however, optimal motion compensation may be implemented by the embodiment of FIG. 10.

While the invention has been described in connection with what is presently considered the most practical and preferred embodiments, it is to be understood that the invention is not limited to the disclosed embodiments, but on the contrary, is intended to cover various modifications and equivalent arrangements included within the spirit and scope of the appended claims.

What is claimed is:

1. An apparatus for decoding a digital signal, comprising:
   composite picture former for forming a composite picture from a first digital video signal and a second digital video signal, said first digital video signal including inter-coded picture data;
   down-converter for receiving a digital video signal, down-converting said digital video signal, and outputting said down-converted digital video signal to said composite picture former as said first digital video signal;
   a memory for storing an anchor picture output from said composite picture former;
   up-converter for receiving said stored anchor picture, and up-converting said stored anchor picture; and
   motion compensator for generating said second digital video signal based on said up-converted anchor picture;
   wherein said down-converter utilizes a down-conversion filter matrix to down-convert said digital video signal, and
   wherein said up-converter utilizes an up-conversion filter matrix to up-convert said stored anchor picture, said up-conversion filter matrix being a Moore-Penrose inverse of said down-conversion filter matrix.

2. A method for decoding a digital signal, comprising:
   forming a composite picture from a first digital video signal and a second digital video signal, said first digital video signal including inter-coded picture data;
   down-converting a digital video to generate the first video signal;
   storing an anchor picture output;
   up-converting said stored anchor picture; and
   motion compensating said up-converted anchor picture to generate said second digital video signal;
   wherein a down-conversion filter matrix performs said down-converting, and
   wherein an up-conversion filter matrix performs said up-converting, said up-conversion filter matrix being a Moore-Penrose inverse of said down-conversion filter matrix.

3. An apparatus for decoding a digital signal comprising:
   down-converting means for down-converting a digital video signal into a down-converted digital video signal, said down-converting means utilizing a down-conversion filter matrix to down-convert said digital video signal;
   a memory for storing anchor pictures which represent said down-converted digital video signal, and for outputting a digital anchor picture signal; and
   up-converting means for receiving said digital anchor picture signal, and for up-converting said digital anchor picture signal to generate an up-converted digital video signal, said up-converting means utilizing an up-conversion filter matrix to up-convert said digital anchor picture signal which is a Moore-Penrose inverse of said down-conversion filter matrix.

4. A method for decoding a digital video signal, comprising:
   down-converting a digital video signal into a down-converted digital video signal, said down-converting being performed with a down-conversion filter matrix;
   storing digital anchor pictures which represent said down-converted digital video signal in a memory;
   outputting a digital anchor picture signal from said memory;
   up-converting said digital anchor picture signal to generate an up-converted digital video signal, said up-converting utilizing an up-conversion filter matrix to up-convert said digital anchor picture signal which is a Moore-Penrose inverse of said down-conversion filter matrix.

\* \* \* \* \*